(12) United States Patent
An

(10) Patent No.: US 10,709,917 B2
(45) Date of Patent: Jul. 14, 2020

(54) CONCRETE STRUCTURE BODY FOR CONSTRUCTING BUILDING FLOOR, HAVING FIREFIGHTING FUNCTION, AND BUILDING FLOOR CONSTRUCTION STRUCTURE INCLUDING SAME

(71) Applicant: ROOMSTAR CO., LTD., Yeongwol-gun, Gangwon-do (KR)

(72) Inventor: Seung Han An, Wonju-si (KR)

(73) Assignee: ROOMSTAR CO., LTD., Yeongwol-Gun (KR)

( * ) Notice: Subject to any disclaimer, the term of this patent is extended or adjusted under 35 U.S.C. 154(b) by 0 days.

(21) Appl. No.: 15/570,337

(22) PCT Filed: Apr. 26, 2016

(86) PCT No.: PCT/KR2016/004351
§ 371 (c)(1),
(2) Date: Oct. 30, 2017

(87) PCT Pub. No.: WO2016/175534
PCT Pub. Date: Nov. 3, 2016

(65) Prior Publication Data
US 2018/0147432 A1 May 31, 2018

(30) Foreign Application Priority Data

Apr. 28, 2015 (KR) .................. 10-2015-0059726

(51) Int. Cl.
*A62C 35/60* (2006.01)
*E04B 1/94* (2006.01)
(Continued)

(52) U.S. Cl.
CPC .............. *A62C 35/60* (2013.01); *A62C 35/02* (2013.01); *A62C 35/15* (2013.01); *A62C 35/68* (2013.01);
(Continued)

(58) Field of Classification Search
CPC ..... E04B 5/48; E04B 5/29; E04B 5/28; E04B 5/265; E04B 5/04; E04B 1/94;
(Continued)

(56) References Cited

U.S. PATENT DOCUMENTS

| 3,104,060 A | 9/1963 | Bricmont |
| 9,664,338 B2 * | 5/2017 | Hata ................ F17C 3/025 |

(Continued)

FOREIGN PATENT DOCUMENTS

| JP | H11-114085 A | 4/1999 |
| KR | 10-2005-0097400 A | 10/2005 |

(Continued)

*Primary Examiner* — Brian E Glessner
*Assistant Examiner* — Adam G Barlow
(74) *Attorney, Agent, or Firm* — Maschoff Brennan

(57) ABSTRACT

The present invention relates to a concrete structure for constructing a building floor and a building floor construction structure including the same. The present invention provides a concrete structure for constructing a building floor which forms a building floor foundation, including: a concrete main body to store fire-extinguishing water for fire suppression; and a fire-extinguishing water injection unit to inject the fire-extinguishing water stored in the concrete main body, and a building floor construction structure including the same. According to the present invention, the concrete structure for forming a building floor stores fire-extinguishing water, and thus early fire suppression is possible, building floor construction is facilitated, and excellent inter-floor sound insulation properties are provided.

7 Claims, 24 Drawing Sheets

(51) Int. Cl.

| | |
|---|---|
| *A62C 35/02* | (2006.01) |
| *A62C 37/42* | (2006.01) |
| *A62C 37/08* | (2006.01) |
| *E04B 5/26* | (2006.01) |
| *A62C 35/15* | (2006.01) |
| *E04C 3/293* | (2006.01) |
| *E04B 5/29* | (2006.01) |
| *E04B 5/48* | (2006.01) |
| *E04B 5/28* | (2006.01) |
| *E04C 3/08* | (2006.01) |
| *A62C 35/68* | (2006.01) |
| *E04B 1/82* | (2006.01) |
| *E04B 5/04* | (2006.01) |
| *E04C 5/06* | (2006.01) |
| *E04C 5/08* | (2006.01) |
| *E04C 3/04* | (2006.01) |
| *E04B 1/76* | (2006.01) |
| *E04G 11/36* | (2006.01) |

(52) U.S. Cl.
CPC ............. *A62C 37/08* (2013.01); *A62C 37/42* (2013.01); *E04B 1/8209* (2013.01); *E04B 1/94* (2013.01); *E04B 5/04* (2013.01); *E04B 5/265* (2013.01); *E04B 5/28* (2013.01); *E04B 5/29* (2013.01); *E04B 5/48* (2013.01); *E04C 3/08* (2013.01); *E04C 3/293* (2013.01); *E04C 5/0622* (2013.01); *E04C 5/08* (2013.01); *E04B 1/7608* (2013.01); *E04B 2103/02* (2013.01); *E04C 2003/0491* (2013.01); *E04G 11/36* (2013.01)

(58) Field of Classification Search
CPC ......... A62C 35/60; A62C 37/42; A62C 37/08; A62C 35/15; A62C 35/68; A62C 35/02; F24D 13/024; H05B 3/28; E04C 2/521; E04C 2/525; E04C 5/0622; E04C 3/08; Y02B 30/24
See application file for complete search history.

(56) References Cited

U.S. PATENT DOCUMENTS

| | | | |
|---|---|---|---|
| 10,190,324 B2 * | 1/2019 | Julton | E04F 15/225 |
| 2011/0284647 A1 * | 11/2011 | Montanari | E01C 11/265 |
| | | | 237/69 |
| 2014/0097169 A1 * | 4/2014 | Charron | F24D 13/024 |
| | | | 219/213 |
| 2015/0034067 A1 * | 2/2015 | Szekely | F24D 3/148 |
| | | | 126/271.1 |
| 2017/0299198 A1 * | 10/2017 | Collins | E04B 5/48 |

FOREIGN PATENT DOCUMENTS

| | | |
|---|---|---|
| KR | 10-2008-0019796 A | 3/2008 |
| KR | 10-0810750 B1 | 3/2008 |
| KR | 10-2008-0048901 A | 6/2008 |
| KR | 10-2008-0073905 A | 8/2008 |
| KR | 10-2013-0118723 A | 10/2013 |
| KR | 10-1395776 B1 | 5/2014 |
| KR | 10-2015-0019107 A | 2/2015 |
| WO | 2007/048144 A2 | 4/2007 |
| WO | 2011/116012 A1 | 9/2011 |

* cited by examiner

CONCRETE STRUCTURE BODY FOR CONSTRUCTING BUILDING FLOOR, HAVING FIREFIGHTING FUNCTION, AND BUILDING FLOOR CONSTRUCTION STRUCTURE INCLUDING SAME

TECHNICAL FIELD

The present invention relates to a concrete structure for constructing a building floor and a building floor construction structure including the same, and more particularly, to a concrete structure for constructing a building floor which stores fire-extinguishing water, and thus has a fire extinguishment function that enables early fire suppression, and a building floor construction structure including the same.

BACKGROUND ART

When constructing multistory buildings such as multifamily homes, apartments, or the like, almost all work is generally performed at the construction site. In addition, high-rise buildings such as some apartments, and the like may be constructed by an assembly method using precasting (PC) technology.

Most buildings are required to install fire extinguishing equipment for fire suppression. Especially, high-rise buildings such as apartments are required to install automatic fire extinguishing systems. In most cases, a sprinkler system is used as an automatic fire extinguishing system. When a fire occurs, the sprinkler system senses heat or smoke, sounds an alarm, and sprays fire-extinguishing water to a fire outbreak site, thereby suppressing fire.

Generally, the sprinkler system includes a main pipe connected to a fire extinguishment tank, as a fire extinguishment pipe, an upright pipe connected to the main pipe, a plurality of branch pipes branched from the upright pipe, and a sprinkler head installed at each branch pipe. The branch pipes are branched into respective households, and the sprinkler heads are opened by heat generated when a fire occurs and spray fire-extinguishing water. The sprinkler head is normally sealed by a high melting point portion formed of a lead (Pb) component, and, when a fire occurs, the high melting point portion is melted by heat to open the sprinkler head.

For example, Korean Patent Registration Nos. 10-0810750 and 10-1395776, Korean Patent Publication Nos. 10-2013-0118723 and 10-2015-0019107, and the like disclose the above related technologies.

Early suppression of fire is very important. However, conventional sprinkler systems have problems such as difficulty of early suppression of fire, high installation cost of related facilities, large energy consumption, and the like. For example, in the case of dry sprinkler systems, it is difficult to spray fire-extinguishing water simultaneously with fire occurrence. That is, in such dry sprinkler systems, a fire extinguishment pipe is not filled with fire-extinguishing water. Accordingly, a predetermined time is required to fill the fire extinguishment pipe with fire-extinguishing water, and thus early fire suppression is difficult. In the case of wet sprinkler systems, early fire control is possible, but a heat insulating material or hot wires need to be installed in a fire extinguishment pipe to prevent the pipe from freezing, and thus early installation costs are high.

In addition, in most sprinkler systems including dry and wet sprinkler systems, for example, early fire suppression for high-rise buildings is difficult due to an insufficient pressure to spray fire-extinguishing water to buildings higher than 15 stories, or a large amount of electric energy is consumed to operate a pump or the like used to provide a high spray pressure.

Meanwhile, in constructing building floors, it is important to block noise and vibration between floors (upstairs and downstairs). Impact applied to a floor, in particular, impact due to severe movement of children in buildings such as apartments, and the like, severely affects residents living downstairs. Accordingly, it may be necessary to install a shock absorber (noise absorber) for absorbing impact in building floor construction. As the shock absorber (noise absorber), a rubber material or a foaming material is mainly used. However, these materials cannot effectively absorb and block impact applied from upstairs.

In addition, to heat a building floor, a heating pipe is generally embedded in a finishing mortar layer. However, this leads to reduced thermal conductivity and, accordingly, energy consumption (heating costs, and the like) increases.

DISCLOSURE

Technical Problem

Therefore, the present invention has been made in view of the above problems, and it is one object of the present invention to provide a concrete structure for constructing a building floor which facilitates building floor construction by forming a building floor foundation and has a fire extinguishment function that enables early fire suppression, and a building floor construction structure including the same.

It is another object of the present invention to provide a building floor construction structure having excellent inter-floor noise insulation by effectively absorbing and buffering impact applied to a building floor.

It is yet another object of the present invention to provide a building floor construction structure having excellent thermal conductivity due to improved heating structure thereof and thus capable of reducing energy consumption.

Technical Solution

According to a first embodiment of the present invention, the present invention provides a concrete structure for constructing a building floor that is a concrete structure for forming a building floor and comprises a concrete main body to store fire-extinguishing water for fire suppression.

In addition, according to a second embodiment of the present invention,

The present invention provides a concrete structure for constructing a building floor that is a concrete structure for forming a building floor and comprises a concrete main body to store fire-extinguishing water for fire suppression; and a fire-extinguishing water injection unit to inject the fire-extinguishing water stored in the concrete main body.

According to an exemplary embodiment, the concrete main body includes: a base plate; a barrier protruding upward from the base plate; and a plurality of fire-extinguishing water cells formed by the barrier.

According to an exemplary embodiment, the fire-extinguishing water injection unit includes: a fire-extinguishing water container embedded in the extinguishing water cell of the concrete main body; a fire-extinguishing water discharge pipe to discharge the fire-extinguishing water stored in the fire-extinguishing water container; and a fire-extinguishing water injector installed at an end of the fire-extinguishing water discharge pipe and injecting the fire-extinguishing water. In addition, a protective member may be installed on an upper portion of the fire-extinguishing water cell.

The present invention also provides a building floor construction structure including the concrete structure. According to an exemplary embodiment, the building floor construction structure according to the present invention includes: an impact absorption unit installed on the concrete structure; a thermally conductive metal plate installed on the impact absorption unit; a thermal insulation material installed on the concrete structure; and a heating pipe installed between the thermal insulation material and the thermally conductive metal plate.

According to an exemplary embodiment, the impact absorption unit comprises: a first substrate fixed to an upper portion of the concrete structure; a plurality of support rods installed on the first substrate; a buffer member inserted into and installed in the support rod and being elastic; a second substrate installed on the buffer member, wherein the second substrate has a guide hole through which an upper end of the support rod is inserted.

Advantageous Effects

According to the present invention, a concrete structure for constructing a building floor itself stores fire-extinguishing water and thus has an early fire suppression effect. In addition, according to the present invention, building floor construction is facilitated and excellent inter-floor sound insulation properties are provided. In addition, due to an improved heating structure, excellent thermal conductivity may be provided and thus energy consumption (heating costs) may be reduced.

BEST MODE

Figure 1:
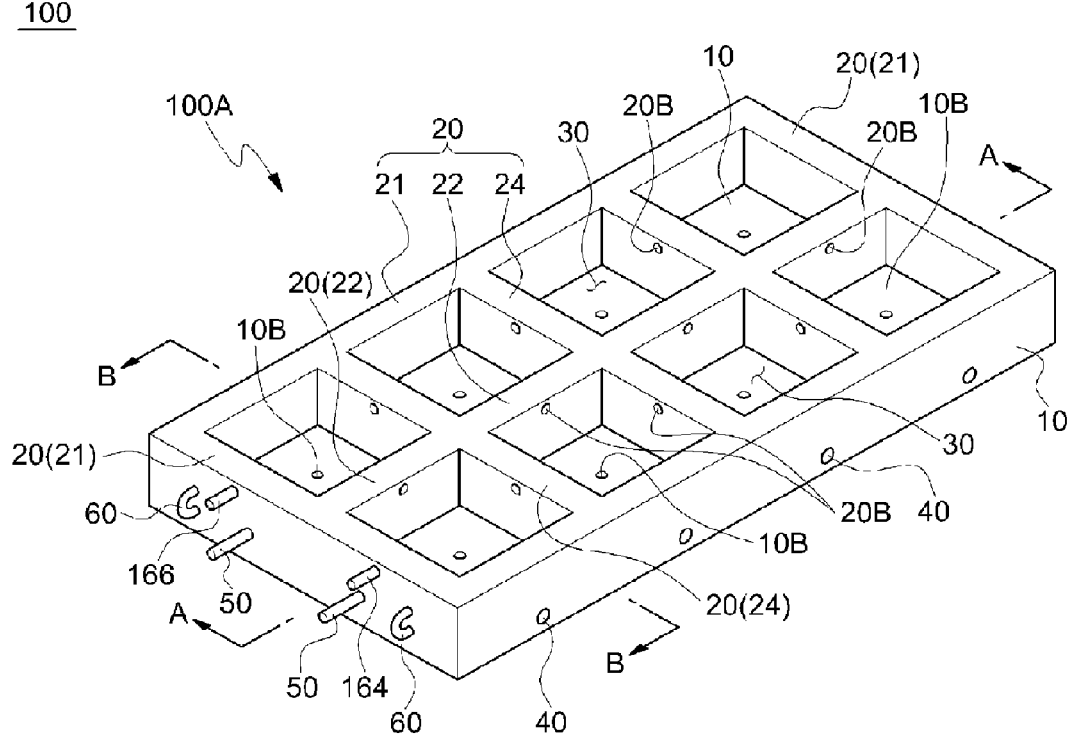
FIG. 1 is a perspective view of a concrete structure for constructing a building floor according to a first embodiment of the present invention.

As used herein, the term "and/or" includes at least one of the associated listed elements. The term "at least one" as used herein means one, two or more. The terms "first", "second", "third", "one side", and "another side" as used herein are used to distinguish one element from another element, and each element should not be limited by these terms.

The terms "formed on", "formed above (upper side)", "formed below (lower side)", "installed on", "installed above (upper side)", and "installed below (lower side)" not only include that corresponding elements are stacked (installed) by direct contact therebetween, but also includes that intervening elements may be formed (installed) therebetween. For example, the term "formed (installed) on" means that a second element is directly formed (installed) on a first element, and a third element may be formed (installed) between the first element and the second element.

In addition, the terms "connected", "installed", "coupled", and "fastened" denote detachable coupling (coupling and detachment) of two elements and also denote an integrated structure. In particular, the terms "connected", "installed", "coupled", and "fastened" include, for example, detachable coupling of two elements via a forcible insertion method; an insertion method using grooves and protrusions;

and a fastening method using a fastening member such as screws, bolts, pieces, rivets, or the like, and also include configurations such that two members are coupled to each other via welding or an adhesive, casting of cement or mortar, integral molding, or the like, and then the two members are not detachable. In addition, the term "installed" also means that two members are stacked (mounted) without a separate binding force therebetween.

Hereinafter, the present invention will be described in detail with reference to the accompanying drawings. The accompanying drawings illustrate exemplary embodiments of the present invention, and are provided merely to aid in understanding of the present invention. In the accompanying drawings, the thickness of each of a plurality of layers and regions may be exaggerated for clear explanation, and the thicknesses, sizes, and/or ratios illustrated in the drawings are not intended to limit the scope of the present invention.

The present invention provides a concrete structure 100 for constructing a building floor (hereinafter, referred to as "concrete structure") having a fire extinguishment (suppression) function, and a building floor construction structure including the same. In particular, the present invention provides the concrete structure 100 for constructing a building floor which itself includes fire-extinguishing water for fire suppression, and thus facilitates building floor construction and enables early fire suppression, and a building floor construction structure constructed using the concrete structure 100.

Hereinafter, in the following description of exemplary embodiments of the present invention, detailed descriptions of related known general functions or configurations are omitted. First, exemplary embodiments of the concrete structure 100 according to the present invention will be described as below.

First Embodiment

Figure 2:
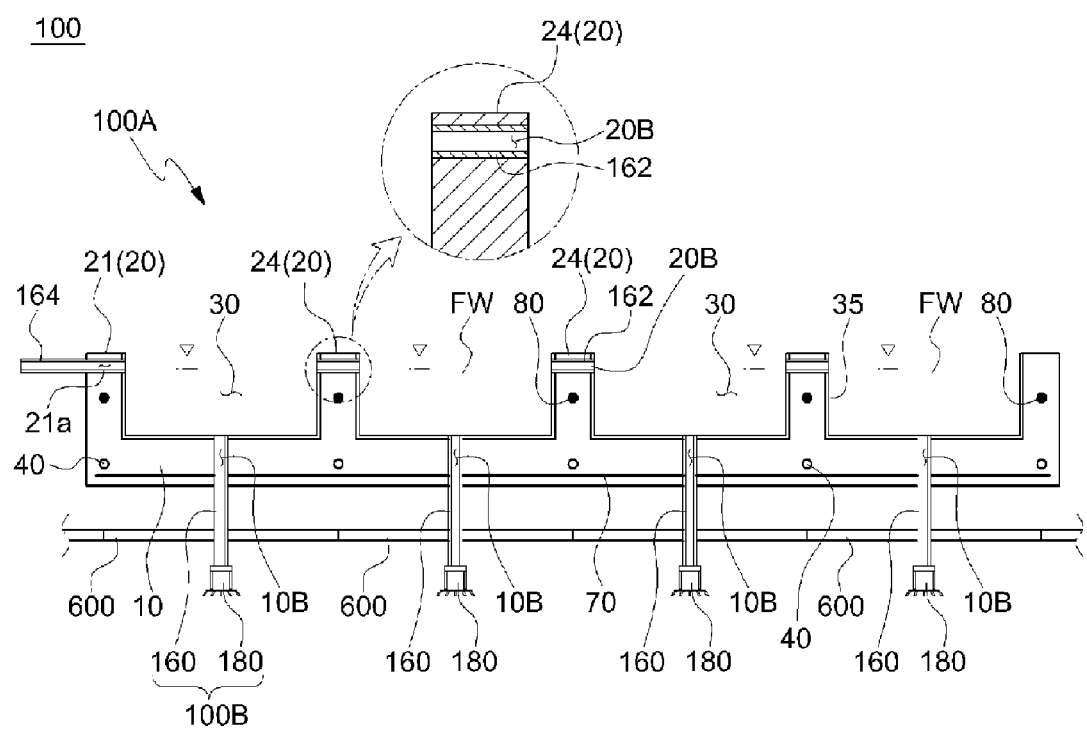
FIG. 2 is a cross-sectional configuration view of the concrete structure for constructing a building floor according to the first embodiment of the present invention, the view being taken along line A-A of FIG. 1.
Figure 3:
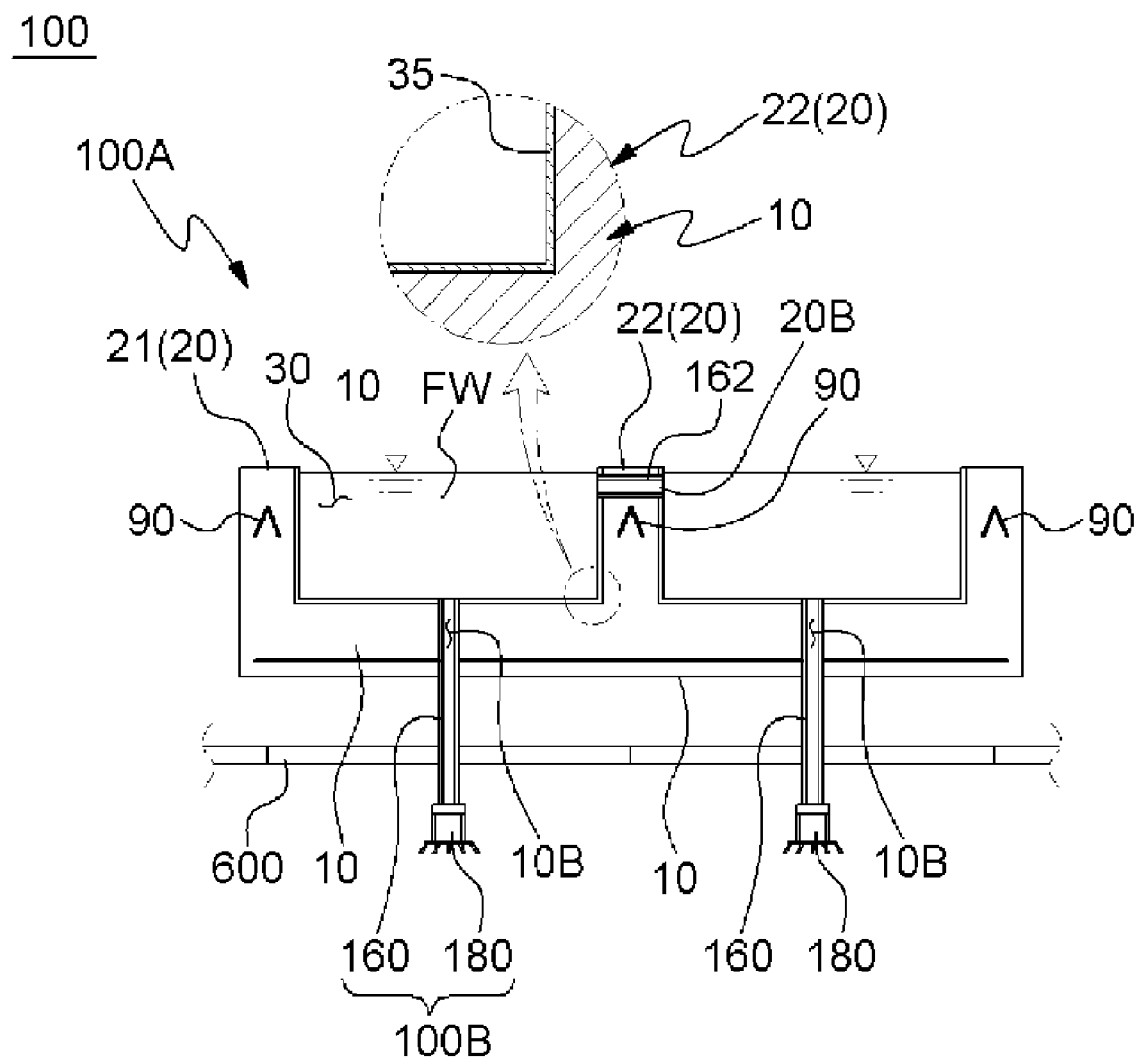
FIG. 3 is a cross-sectional configuration view of the concrete structure for constructing a building floor according to the first embodiment of the present invention, the view being taken along line B-B of FIG. 1.

FIG. 1 is a perspective view of the concrete structure 100 according to a first embodiment of the present invention. FIG. 2 is a cross-sectional view taken along line A-A of FIG. 1. FIG. 3 is a cross-sectional view taken along line B-B of FIG. 1.

Referring to FIGS. 1 to 3, the concrete structure 100 according to the present invention is a structure for forming a building floor foundation, and, according to the first embodiment of the present invention, includes at least a concrete main body 100A. According to a second embodiment of the present invention, the concrete structure 100 includes the concrete main body 100A and a fire-extinguishing water injection unit 100B. In this case, the concrete main body 100A stores fire-extinguishing water FW for fire suppression, and the fire-extinguishing water injection unit 100B injects the fire-extinguishing water FW stored in the concrete main body 100A.

In the present invention, the concrete main body 100A has a panel shape, a block shape, or the like, and forms a building floor foundation. The concrete main body 100A replaces, for example, an existing concrete slab. In particular, in the present invention, the concrete main body 100A forms a building floor structure (floor foundation), replaces an existing slab to distinguish one floor from another, and forms a floor foundation. In this case, in the present invention, each floor includes a ground floor and a basement floor.

The size (length, width, and/or thickness) of the concrete main body 100A is not limited. The concrete main body 100A or two or more of the concrete main bodies 100A may be fastened and assembled according to the size (scale) of buildings and/or the size of the concrete main body 100A itself to form a building floor. According to one embodiment, the concrete main body 100A may have a size sufficient to form a single floor via fastening of two or more of the concrete main bodies 100A in consideration of conveying and installation work, and the like.

Referring to FIG. 1, the concrete main body 100A has, for example, a rectangular parallelepiped plate shape. In addition, the concrete main body 100A may include a base plate 10, a barrier 20 protruding upward from the base plate 10, and a plurality of fire-extinguishing water cells 30 capable of storing the fire-extinguishing water FW.

The base plate 10 has, for example, a rectangular parallelepiped plate shape. The barrier 20 protrudes upward from the base plate 10 and extends in an integrated form. More particularly, the concrete main body 100A includes the base plate 10 having a rectangular parallelepiped plate shape, and the barrier 20 protruding from the base plate 10 in an integrated form. In addition, the barrier 20 may include outer barriers 20 (21) formed at edges of the base plate 10, and inner barriers (20) (22) (24) formed on an inside of the base plate 10. The base plate 10 and the barrier 20 may be made of a concrete material, and may be simultaneously molded integrally by casting and curing concrete via a mold 110 (see FIG. 9).

The barrier 20 may have a lattice structure and/or a honeycomb structure. In the present invention, the lattice structure includes not only a grid structure in which the barrier 20 is arranged in length (transversal) and width (longitudinal) directions of the concrete main body 100A into a tetragonal shape, but also a waffle structure in which the barrier 20 is arranged in a diagonal direction into a rhombus (or parallelogram) form. In addition, in the present invention, the honeycomb structure includes a pentagonal shape, a hexagonal shape, an octahedral shape, and/or a circular shape.

The drawings illustrate the barrier 20 as having a tetragonal lattice structure. In particular, as illustrated in FIG. 1, the barrier 20 includes an outer wall 21 protruding from edges of the base plate 10, a plurality of transversal walls 22 protruding from the base plate 10 in a length (transversal) direction, and a plurality of longitudinal walls 24 protruding from the base plate 10 in a width (longitudinal) direction, wherein the outer wall 21 may have a tetragonal frame shape, and the transversal and longitudinal barriers 22 and 24 may be arranged perpendicular to each other to form a tetragonal lattice structure.

The fire-extinguishing water cells 30 store the fire-extinguishing water FW for fire suppression. In the present invention, the fire-extinguishing water cells 30 may have any shape as long as they store the fire-extinguishing water FW. According to one embodiment, the fire-extinguishing water FW may be directly injected into the fire-extinguishing water cells 30 and stored therein. According to an exemplary embodiment, the fire-extinguishing water FW is stored in the fire-extinguishing water cells 30 via a fire-extinguishing water container 150 (see FIGS. 12 to 14). In particular, according to an exemplary embodiment, the fire-extinguishing water container 150 is built in each fire-extinguishing water cell 30, and the fire-extinguishing water FW is injected into the fire-extinguishing water container 150 and stored therein.

The fire-extinguishing water cells 30 are groove-shaped spaces arranged on the base plate 10, and are formed by the barrier 20. The fire-extinguishing water cells 30 may have various shapes according to the shape of the barrier 20, and, for example, may have a cross-sectional shape such as a tetragonal shape, a pentagonal shape, a hexagonal shape, an octagonal shape, and/or a circular shape. The fire-extinguishing water cell 30 is provided in plural, and the fire-extinguishing water cells 30 are spaces partitioned by the transversal barriers 22 and the longitudinal barriers 24. The number of the fire-extinguishing water cells 30 is not limited. The fire-extinguishing water cells 30 may be arranged in, for example, two columns to twenty columns in the transversal (length) direction of the concrete main body 100A and in one row to ten rows in a longitudinal (width) direction of the concrete main body 100A. FIG. 1 illustrates a total eight fire-extinguishing water cells 30 arranged in four columns in a transversal (length) direction and in two rows in a longitudinal (width) direction.

In addition, according to an embodiment of the present invention, the concrete main body 100A may further include a through-hole 40. The through-hole 40 may be provided in plural in at least one direction selected from the transversal (length) direction and the longitudinal (width) direction of the concrete main body 100A. The through-holes may be formed in at least the longitudinal (width) direction of the concrete main body 100A. The through-holes 40 may be formed in the base plate 10 in the longitudinal (width) direction of the concrete main body 100A. In constructing a building floor foundation, according to the present invention, when the concrete main bodies 100A are constructed via fastening, the through-holes 40 are usefully used. In particular, a tension wire TW (see FIG. 17) for fastening neighboring concrete main bodies 100A with each other may be inserted into the through-hole 40 to reinforce an assembly force between the concrete main bodies 100A.

According to an exemplary embodiment of the present invention, the concrete main body 100A may further include inserts 50 installed on a side surface thereof. One side of the insert 50 is embedded in a side surface of the concrete main body 100A, and another side thereof is exposed to the outside. The insert 50 is used for connection to an iron bar F embedded in a wall W (see FIG. 17) of a building. In this case, the inserts 50 and the iron bars F are rigidly connected to each other by, for example, welding or the like. The concrete main body 100A may have a strong binding strength with the wall W of a building by these inserts 50.

In addition, according to another embodiment of the present invention, the concrete main body 100A may further include hook members 60 installed on a side surface thereof. As illustrated in FIG. 1, one side of the hook member 60 is embedded in a side surface of the concrete main body 100A, and another side thereof is exposed to the outside. The hook members 60 may be used when carrying or installing the concrete main body 100A. In particular, the concrete main body 100A may be carried or installed by grabbing the hook members 60, or connecting a device such as a crane to the hook members 60. Accordingly, the hook members 60 may facilitate carrying or installation of the concrete main body 100A. The hook members 60 may be removed after use. That is, after carrying or installation of the concrete main body 100A is completed, the hook members 60 may be separated from the concrete main body 100A and removed.

Referring to FIGS. 1 to 3, the fire-extinguishing water injection unit 100B injects the fire-extinguishing water FW when a fire occurs to suppress the fire. In the present invention, the fire-extinguishing water injection unit 100B may inject the fire-extinguishing water FW stored in the concrete main body 100A as described above.

According to the first embodiment of the present invention, the fire-extinguishing water FW is injected into the fire-extinguishing water cells 30 and stored therein, and the fire-extinguishing water injection unit 100B injects the fire-extinguishing water FW stored in the fire-extinguishing water cells 30. The fire-extinguishing water injection unit 100B includes a fire-extinguishing water discharge pipe 160 to discharge the fire-extinguishing water FW and a fire-extinguishing water injector 180 to inject the fire-extinguishing water FW. According to the first embodiment of the present invention, the fire-extinguishing water FW may be directly injected into the fire-extinguishing water cells 30 and stored therein. In this case, the fire-extinguishing water FW stored in each fire-extinguishing water cell 30 is discharged via the fire-extinguishing water discharge pipe 160, and then injected towards a fire outbreak site via the fire-extinguishing water injector 180.

As illustrated in FIGS. 1 to 3, in the base plate 10, the discharge hole 10B is connected to each fire-extinguishing water cell 30 to allow a fluid to flow therebetween. The number of the discharge holes 10B is equal to or greater than the number of the fire-extinguishing water cells 30. In this case, one or more discharge holes 10B may be connected to each fire-extinguishing water cell 30 to allow a fluid to flow therebetween. The fire-extinguishing water discharge pipe 160 is inserted into the discharge hole 10B and installed therein. In particular, as illustrated in FIGS. 2 and 3, one side (upper side in the drawing) of the fire-extinguishing water discharge pipe 160 is inserted into the discharge hole 10B and installed therein, and another side of the fire-extinguishing water discharge pipe 160 is exposed to a lower side and coupled to the fire-extinguishing water injector 180. As described above, the fire-extinguishing water cell 30 is provided in plural in the concrete main body 100A. In this case, one fire-extinguishing water discharge pipe 160 or two or more fire-extinguishing water discharge pipes 160 are installed in the fire-extinguishing water cell 30.

The fire-extinguishing water injector 180 is installed at an end of each fire-extinguishing water discharge pipe 160. The fire-extinguishing water injector 180 passes through a ceiling finishing material 600 and is exposed to the outside, and injects the fire-extinguishing water FW towards a fire outbreak site. The fire-extinguishing water injector 180 is not particularly limited so long as it is capable of injecting the fire-extinguishing water FW discharged from the fire-extinguishing water discharge pipe 160. According to one embodiment, the fire-extinguishing water injector 180 may be selected from sprinkler heads used in general sprinkler systems, and the like.

According to an embodiment of the present invention, the concrete main body 100A may further include a fire-extinguishing water flow path 20B (162) that allows a fluid to flow between neighboring fire-extinguishing water cells 30. The fire-extinguishing water flow path 20B (162) is formed in the barrier 20, and may be formed in at least the transversal walls and/or the longitudinal walls 24. The fire-extinguishing water flow path 20B (162) is not particularly limited as long as it allows the fire-extinguishing water FW to flow therethrough, and may be selected from, for example, grooves formed at an upper end of the barrier 20 and/or connection holes 20B formed in the barrier 20 via perforation. In addition, the fire-extinguishing water flow path 20B (162) may further include a connection pipe 162 inserted into and installed in the connection hole 20B. The fire-extinguishing water cells 30 may be connected to each other by the fire-extinguishing water flow path 20B (162), thereby facilitating the injection and/or supplement of the fire-extinguishing water FW.

In addition, the concrete main body 100A may further include a fire-extinguishing water inlet 164 to inject the fire-extinguishing water FW into the fire-extinguishing water cells 30. The fire-extinguishing water inlet 164 is formed on one side of the concrete main body 100A. In particular, the fire-extinguishing water inlet 164 may be formed at the barrier 20 of the concrete main body 100A, in particular, at the outer wall 21 arranged in edges of the concrete main body 10. For example, an insertion hole 21a may be formed in the outer wall 21, and the fire-extinguishing water inlet 164 may be inserted into and installed in the insertion hole 21a.

[1] In addition, the concrete main body 100A may further optionally include an air discharge hole 166 to discharge air present inside the fire-extinguishing water cells 30 to the outside. The air discharge hole 166 is formed on one side of the concrete main body 100A. In particular, the air discharge hole 166 may be formed in the barrier 20 of the concrete main body 100A, in particular, in the outer wall 21 arranged in the edge of the concrete main body 100A. For example, an insertion hole (not shown) is formed in the outer wall 21, and the air discharge hole 166 may be inserted into and installed in the insertion hole.

According to an embodiment of the present invention, the fire-extinguishing water FW may be injected into the fire-extinguishing water cells 30 and stored therein after constructing the concrete main body 100A in a building. In this case, the fire-extinguishing water FW may be injected into the fire-extinguishing water cells 30 via the fire-extinguishing water inlet 164 formed on one side of the concrete main body 100A. In addition, when injecting the fire-extinguishing water FW, air present inside the fire-extinguishing water cells 30 is discharged to the outside via the air discharge hole 166, and thus injection of the fire-extinguishing water FW is facilitated.

In addition, when any one of the fire-extinguishing water cells 30 is filled with the fire-extinguishing water FW via the fire-extinguishing water inlet 164, neighboring fire-extinguishing water cells may be consecutively filled with the fire-extinguishing water FW via the fire-extinguishing water flow path 20B (162) formed in the barrier 20. In addition, when all the fire-extinguishing water FW stored in the fire-extinguishing water cells 30 is consumed by fire suppression, each fire-extinguishing water cell 30 may be filled and supplemented with the fire-extinguishing water FW through the above-described processes. Thus, the fire-extinguishing water FW may be easily injected and supplemented by the fire-extinguishing water flow path 20B (162), the fire-extinguishing water inlet 164, and/or the air discharge hole 166.

According to an embodiment of the present invention, a waterproof layer 35 may be formed on wall surfaces of each fire-extinguishing water cell 30. In particular, the waterproof layer 35 may be formed on an upper surface of the base plate 10 and wall surfaces of the barrier 20, of each fire-extinguishing water cell 30. The waterproof layer 35 may have waterproof properties to prevent the fire-extinguishing water FW from permeating the waterproof layer 35. The waterproof layer 35 may, for example, be provided with a waterproof film attached thereto, or coated with a waterproof agent. The waterproof agent may be selected from, for example, waterproof organic materials and/or organic-inorganic composites and so on. In particular, the waterproof agent may be a waterproof composition including at least one resin selected from silicone, urethane, and epoxy and so on.

In addition, according to an embodiment of the present invention, the concrete main body 100A may further include a reinforcing core material. The reinforcing core material may be any reinforcing core material capable of improving the strength of the concrete main body 100A, and is embedded in the concrete main body 100A. The reinforcing core material may be selected from, for example, metal mesh, metal porous plates, iron bars, truss girders, and/or fibrous sheets. The reinforcing core material may be embedded in the base plate 10 and/or the barrier 20 of the concrete main body 100A.

Referring to FIGS. 2 and 3, according to an exemplary embodiment of the present invention, at least one reinforcing core material selected from a metal mesh 70, a metal porous plate, and a fibrous sheet may be embedded in the base plate 10. In addition, referring to FIGS. 2 and 3, at least one selected from an iron bar 80 (see FIG. 2) and/or a truss girder 90 (see FIG. 3) may be embedded in the barrier 20. In one embodiment, the iron bar 80 may be embedded in the longitudinal walls 24 of the barrier 20, and the truss girder 90 may be embedded in the transversal walls 22 of the barrier 20. The truss girder 90 has a stereoscopic structure with three or more main bars 92 connected to each other via wires, and is suitable for use to reinforce the concrete main body 100A.

FIGS. 4 to 8 illustrate various embodiments of the truss girder 90 as an example of the reinforcing core material that may be embedded in the concrete main body 100A. Referring to FIGS. 4 to 8, the truss girder 90 has a stereoscopic structure including at least three main bars 92 and steel wires 94 to connect the main bars 92 to one another. In this case, iron pipes, iron bars, and/or wires may be used as the main bars 92 and the steel wires 94, and the steel wire 94 has a smaller diameter than that of the main bar 92.

Figure 4:
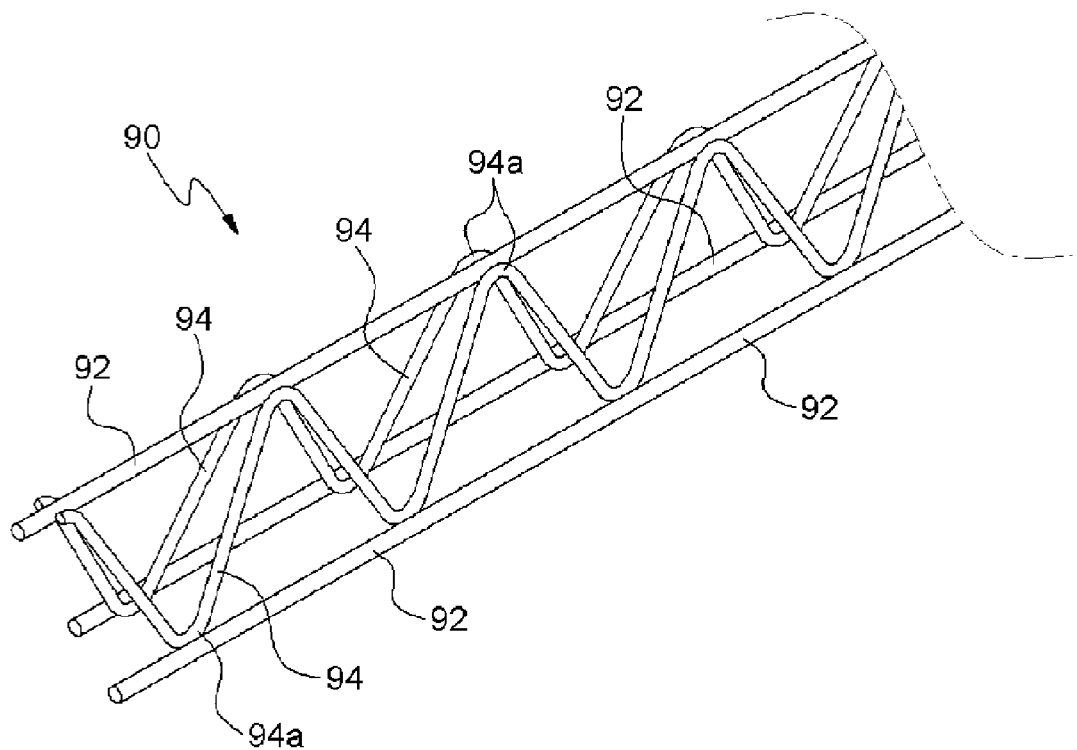
FIGS. 4 to 8 illustrate various embodiments of a truss girder used in the present invention.
Figure 5:
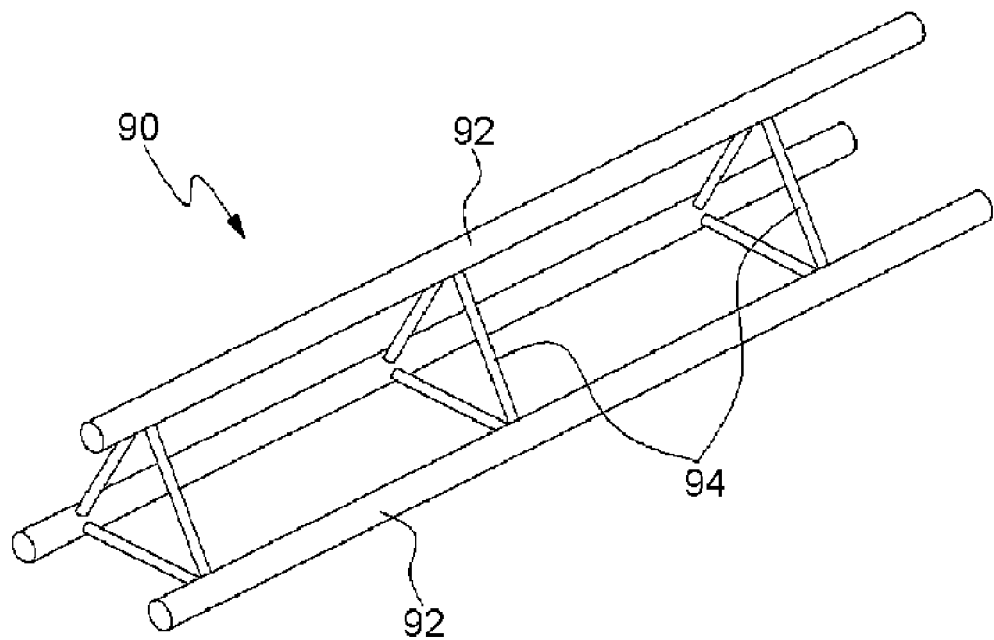
Figure 6:
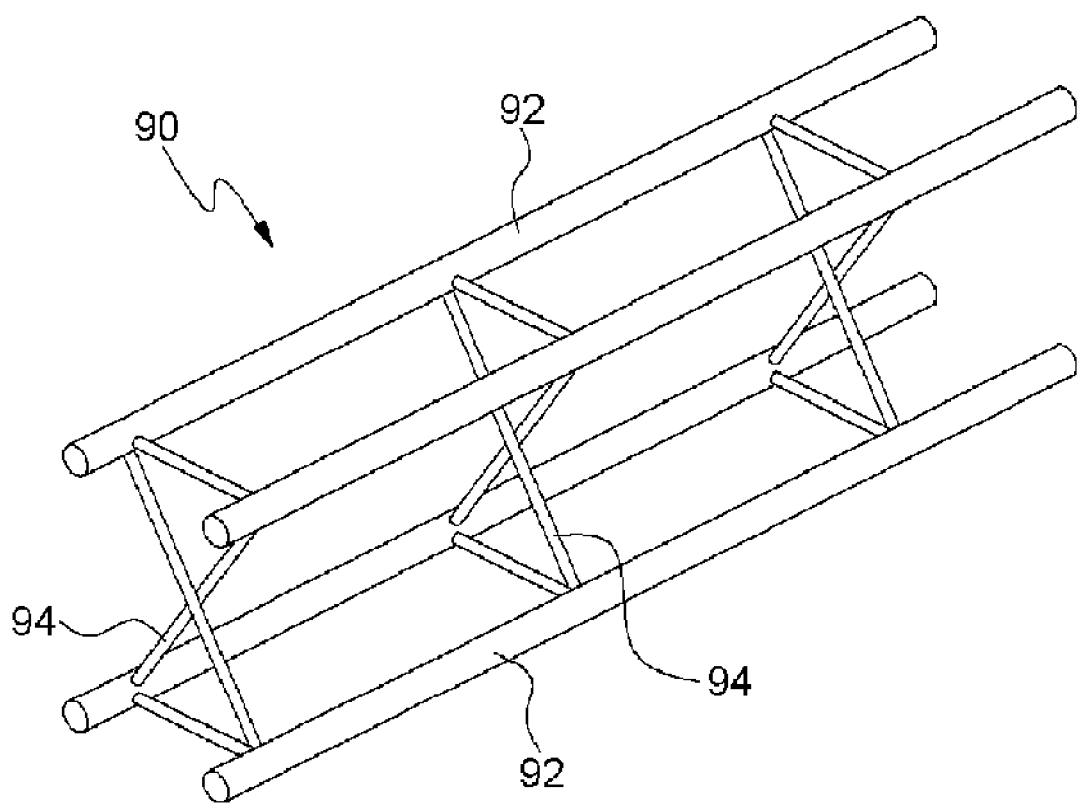
Figure 7:
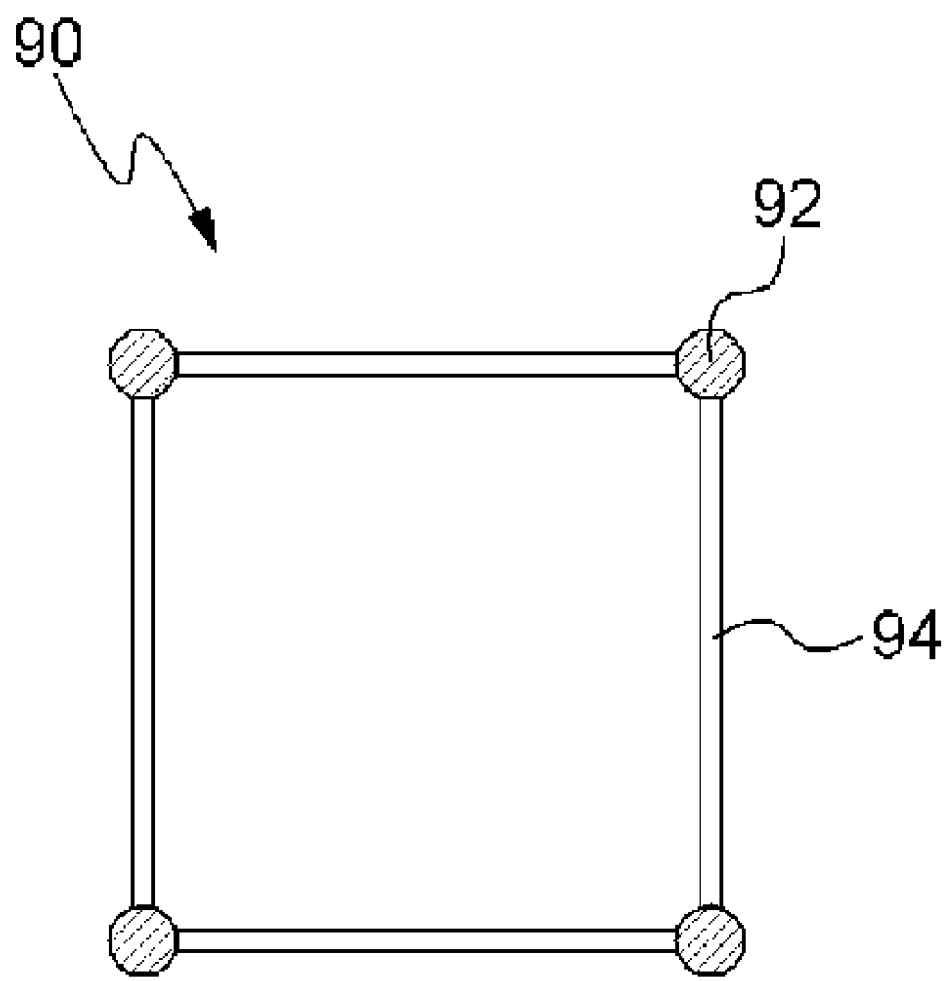
Figure 8:
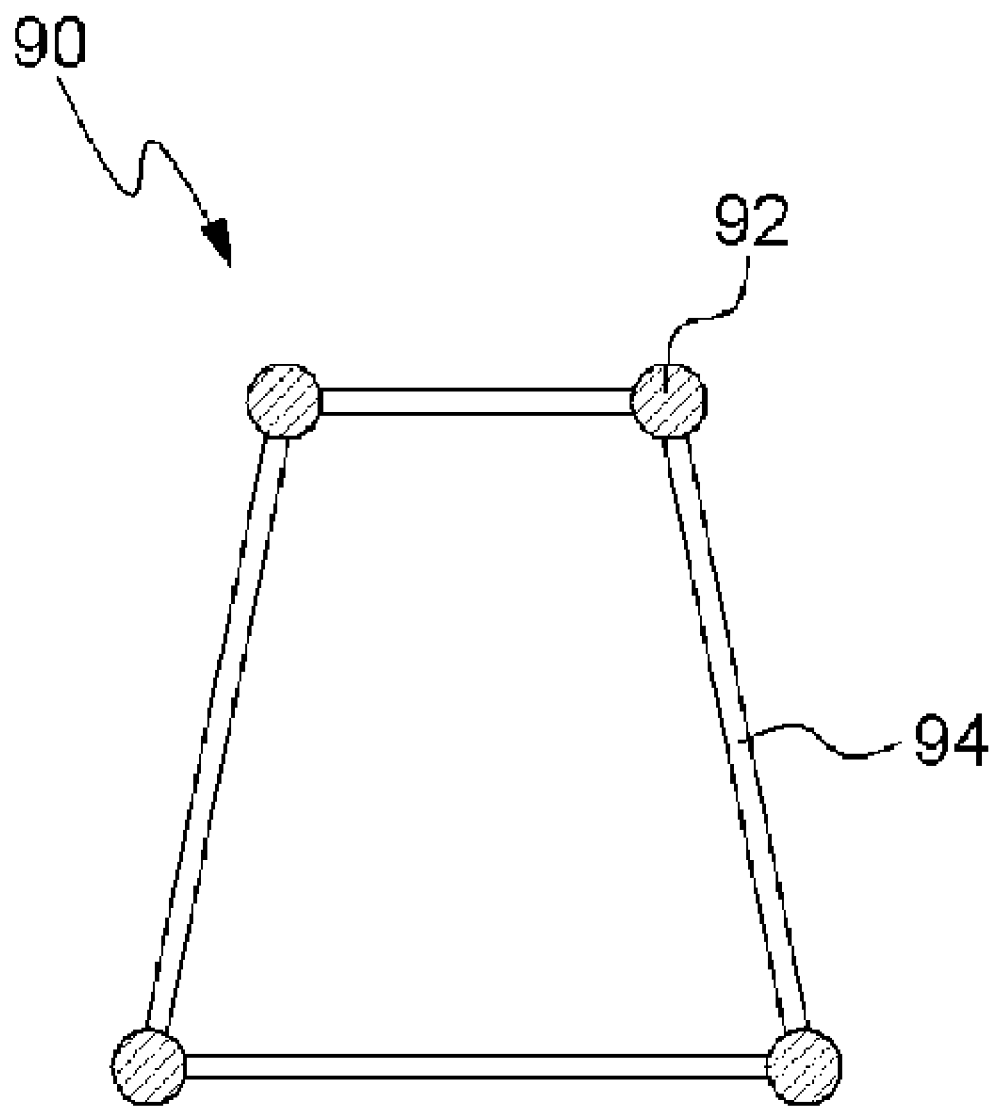

The truss girder 90 has various types of stereoscopic structures according to the number and arrangement of the main bars 92. FIGS. 4 and 5 illustrate the truss girder 90 including three main bars 92 and having a triangular shape, and FIG. 6 illustrates a structure including four main bars 92 and the steel wires 94 connected thereto in an X form. FIG. 7 illustrates the truss girder 90 having a tetragonal shape, and FIG. 8 illustrates the truss girder 90 having a trapezoidal cross-sectional shape. The truss girder 90 having such a stereoscopic structure enhances support strength, tensile strength, and the like of the concrete main body 100A, thereby effectively supporting load thereof.

In an exemplary embodiment, the truss girder 90 may be selected from stereoscopic structures as illustrated in FIG. 4. Referring to FIG. 4, the truss girder 90 includes a plurality of main bars 92 and steel wires 94 that connect the main bars 92 to each other, and the steel wire 94 may have a bent structure that connects the main bars 92 to each other. The truss girder 90 having such a structure is very effective in reinforcing the support strength, tensile strength, and the like of the concrete main body 100A. In this regard, FIG. 4 illustrates the truss girder 90 consisting of three main bars 92 and two steel wires 94. As illustrated in FIG. 4, each steel wire 92 connects the two main bars 92 to each other, and has a structure wherein the steel wire 92 continuously connects the main bars 92 to each other while bent in bent portions 94a. In addition, the steel wires 94 may be coupled to the main bars 92 in the bent portions 94a via welding, wiring, or the like.

Figure 9:
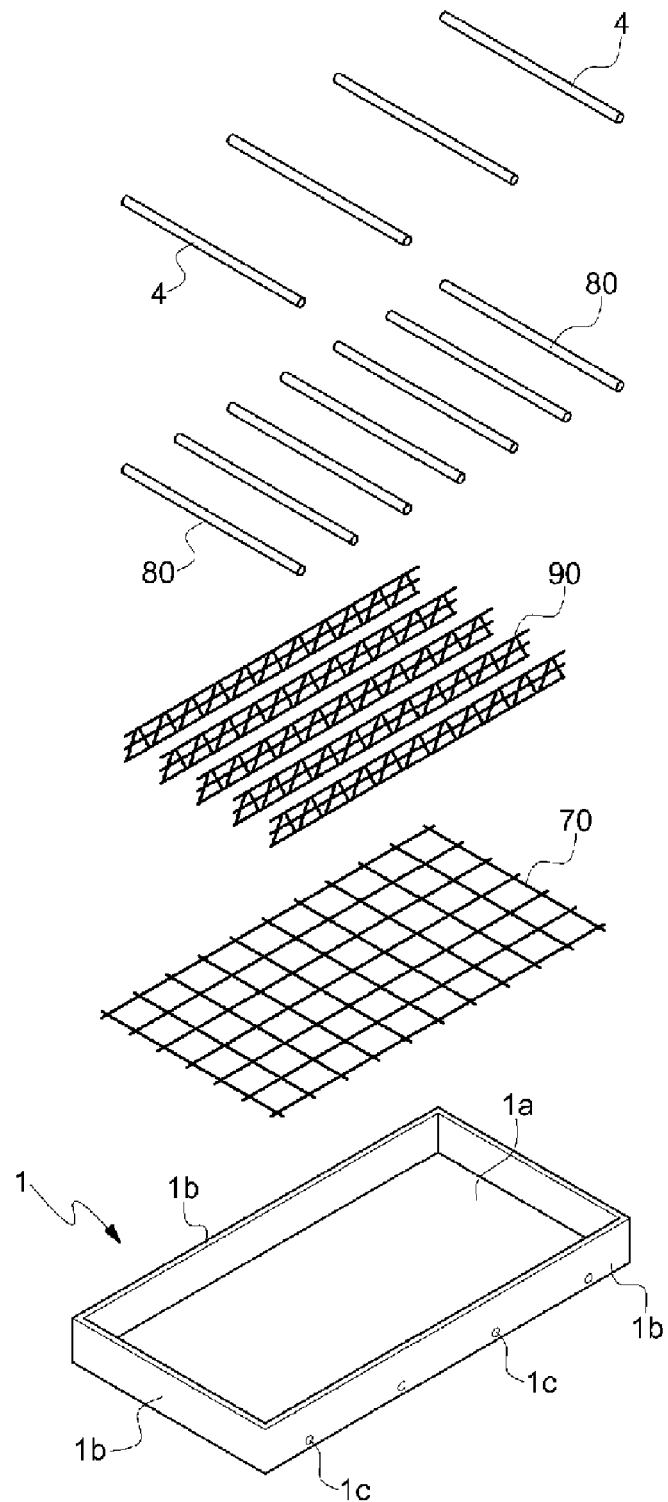
FIG. 9 is a view for explaining a method of manufacturing a concrete main body according to the present invention.
Figure 10:
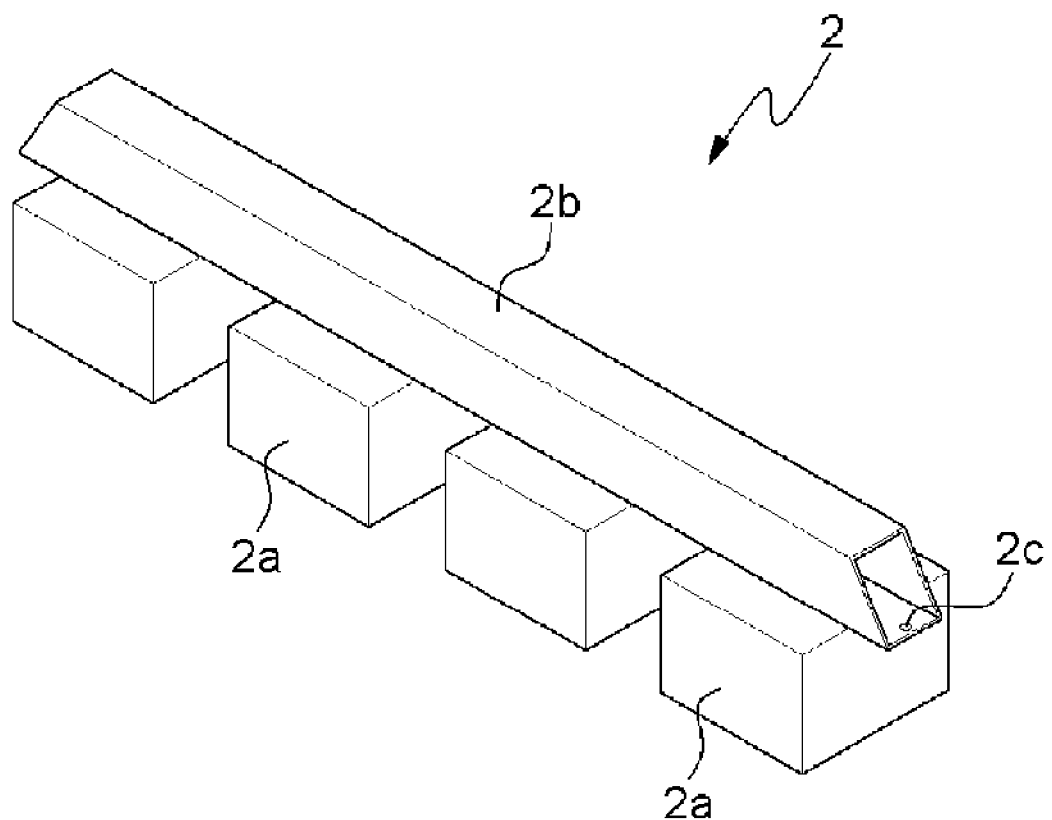
FIG. 10 is a perspective view illustrating an embodiment of a molding frame for forming a fire-extinguishing water cell according to the present invention.
Figure 11:
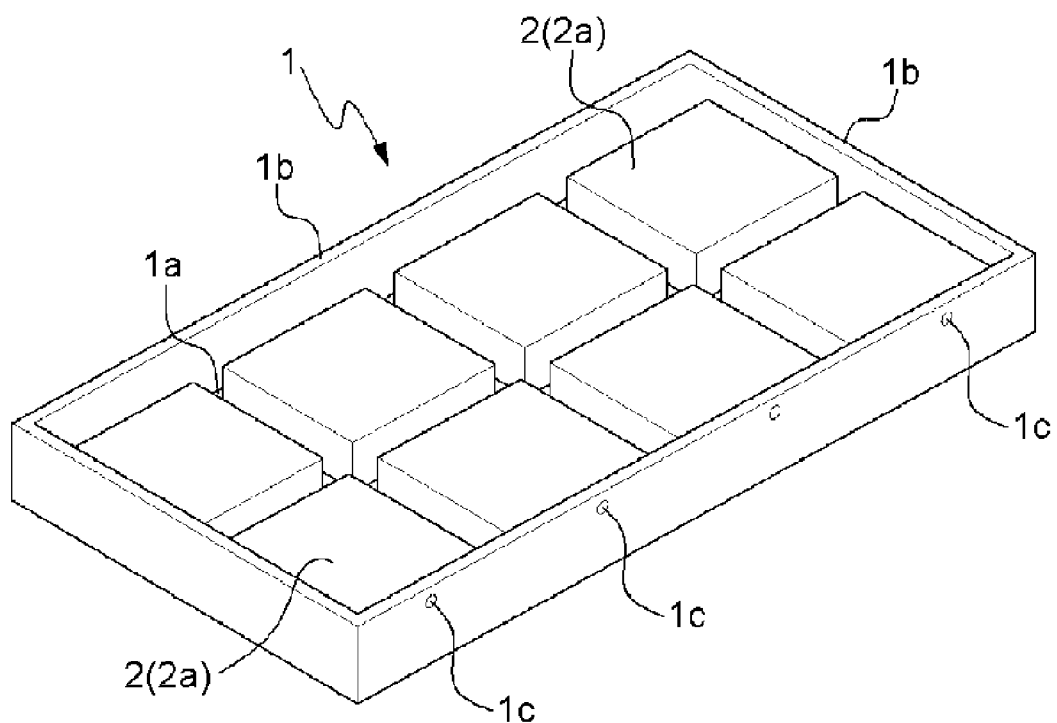
FIG. 11 is a perspective view illustrating another embodiment of a mold used in the present invention.

The concrete main body 100A may be manufactured (molded) using various methods, for example, may be manufactured as follows. FIG. 9 is a view for explaining a method of manufacturing the concrete main body 100A. FIG. 10 illustrates a molding frame 120 for forming the fire-extinguishing water cells 30. FIG. 11 illustrates another embodiment of a mold 110 for molding the concrete main body 100A.

[2] First, referring to FIGS. 9 and 10, the concrete main body 100A may be manufactured using processes including: a first process of installing a reinforcing core material in a mold 1; a second process of installing a molding frame 2 for forming the fire-extinguishing water cells 30; and a third process of casting and curing concrete in the mold 1.

In the first process of installing a reinforcing core material may include installing at least one reinforcing core material selected from the metal mesh 70, a metal porous plate, the iron bar 80, the truss girder 90, and a fibrous sheet as described above. In one embodiment, first, the metal mesh 70 may be installed in the mold 1, and the iron bars 80 and the truss girders 90 may be installed on the metal mesh 70. In this case, the iron bars 80 may be installed in a longitudinal (width) direction to be embedded in the longitudinal walls 24, and the truss girders 90 may be installed in a transversal (length) direction to be embedded in the transversal walls 22. In addition, the reinforcing core materials, i.e., the metal mesh 70, the iron bars 80, and the truss girders 90, may be wired to one another. In the present invention, wiring refers to connecting members to each other using wires such as steel wires, or the like.

In addition, the manufacture of the concrete main body 100A may further include a fourth process of installing hollow pipes 4 in the mold 1. The hollow pipes 4 are used to form the through-holes 40, and are removed after curing concrete. The hollow pipes 4 are not particularly limited as long as they are hollow, and may be selected from, for example, metal pipes, synthetic resin pipes, and the like. The fourth process of installing hollow pipes 4 may be performed between the first process and the second process, or between the second process and the third process.

Referring to FIG. 9, the mold 1 includes a bottom plate 1a, and four wall parts 1b formed on side walls of the bottom plate 1a. In this case, at least one of the four wall parts 1b may be detachable to easily remove the concrete main body 100A. In addition, through-holes 1c through which the hollow pipes 4 pass may be formed in the wall part 1b of the mold 1. In addition, as described above, the insert 50 and an insertion hole (not shown) for embedding the hook member 60 may be formed in the wall part 1b of the mold 1.

Referring to FIG. 10, the molding frame 2 is used to form the fire-extinguishing water cells 30, and includes at least cell forming frames 2a having a shape corresponding to the fire-extinguishing water cells 30. In this case, the cell forming frame 2a has a shape corresponding to the fire-extinguishing water cell 30 and may have various shapes. The cell forming frame 2a may have various cross-sectional shapes, for example, a triangular shape, a tetragonal shape, a pentagonal shape, a hexagonal shape, a rhombus shape, and/or a circular shape. In addition, according to such installation of the cell forming frames 2a, not only the fire-extinguishing water cells 30 may be formed, but the barrier 20 having the above-described lattice structure and/or the honeycomb structure may also be formed.

In one embodiment, as illustrated in FIG. 10, the molding frame 2 may include a plurality of cell forming frames 2a to form the fire-extinguishing water cells 30; and a connection frame 2b to connect the cell forming frames to one another. In addition, as illustrated in FIG. 10, fastening holes 2c for inserting a fastener such as a bolt or the like may be formed on opposite ends of the connection frame 2b. Thus, when the molding frame 2 is installed in the mold 1, the opposite ends of the connection frame 2b may be mounted on the wall part 1b of the mold 1, and then fastened with the mold 1 via a fastener such as a bolt or the like via the fastening holes 2c, thereby rigidly fixing the molding frame 2 to the mold 1.

FIG. 11 illustrates another embodiment of the mold 1. Referring to FIG. 11, according to another embodiment, the concrete main body 100A may be manufactured using processes including: installing the molding frame 2 on the bottom plate 1a of the mold 1; installing a reinforcing core material on the molding frame 2; and casting and curing concrete in the mold 1. That is, the concrete main body 100A may be manufactured in a form in which the concrete main body 100A of FIG. 1 is turned upside down. In this regard, the molding frame 2 includes at least a plurality of cell forming frames 2a having a shape corresponding to the fire-extinguishing water cells 30. In particular, the cell forming frames 2 are arranged as the molding frame 2 on the bottom plate 1a of the mold 1 with predetermined intervals therebetween, followed by installation of reinforcing core materials and casting and curing of concrete.

Hereinafter, second and third embodiments of the concrete structure 100 according to the present invention will be described. In description of the second and third embodiments of the present invention, the same terms and reference numerals as those of the first embodiment have the same functions, and thus a detailed description thereof is omitted. In addition, portions that are not particularly described hereinafter are the same as described in the first embodiment. In addition, the first embodiment may include configurations of the second and third embodiments, which will be described below, and portions that have not been described in the first embodiment are the same as described in the following description of the second and third embodiments.

Second Embodiment

Figure 12:
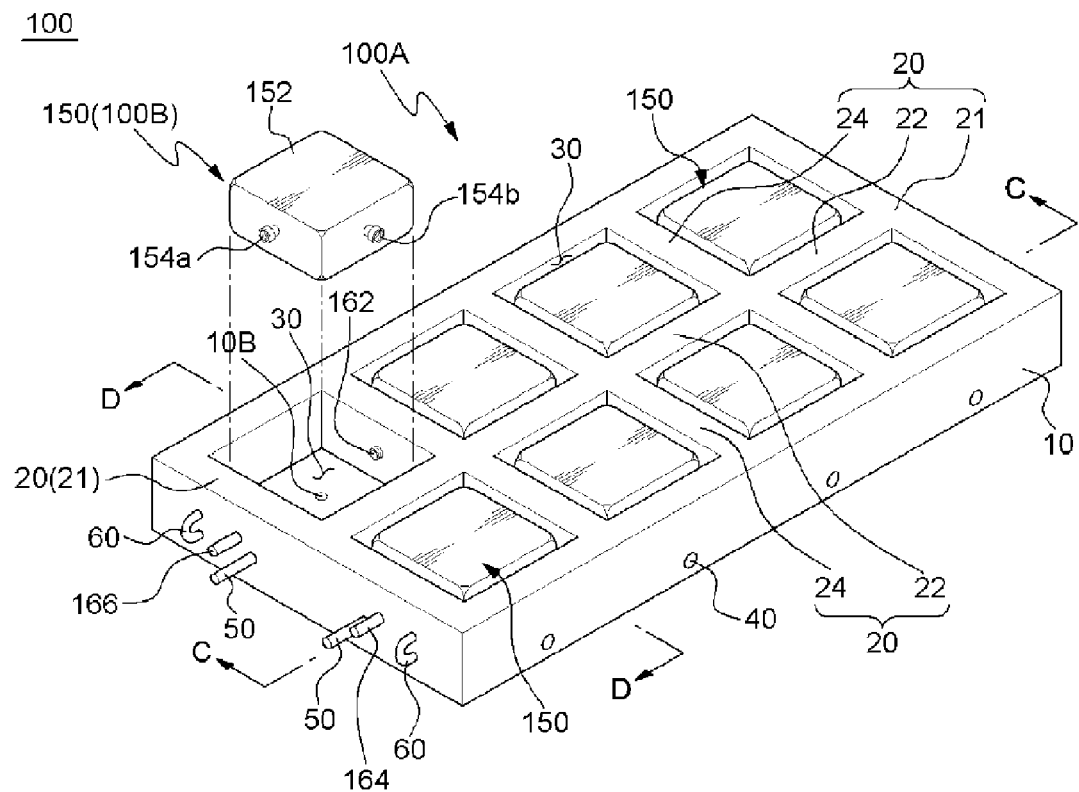
FIG. 12 is a perspective view of a concrete structure for constructing a building floor according to a second embodiment of the present invention.
Figure 13:
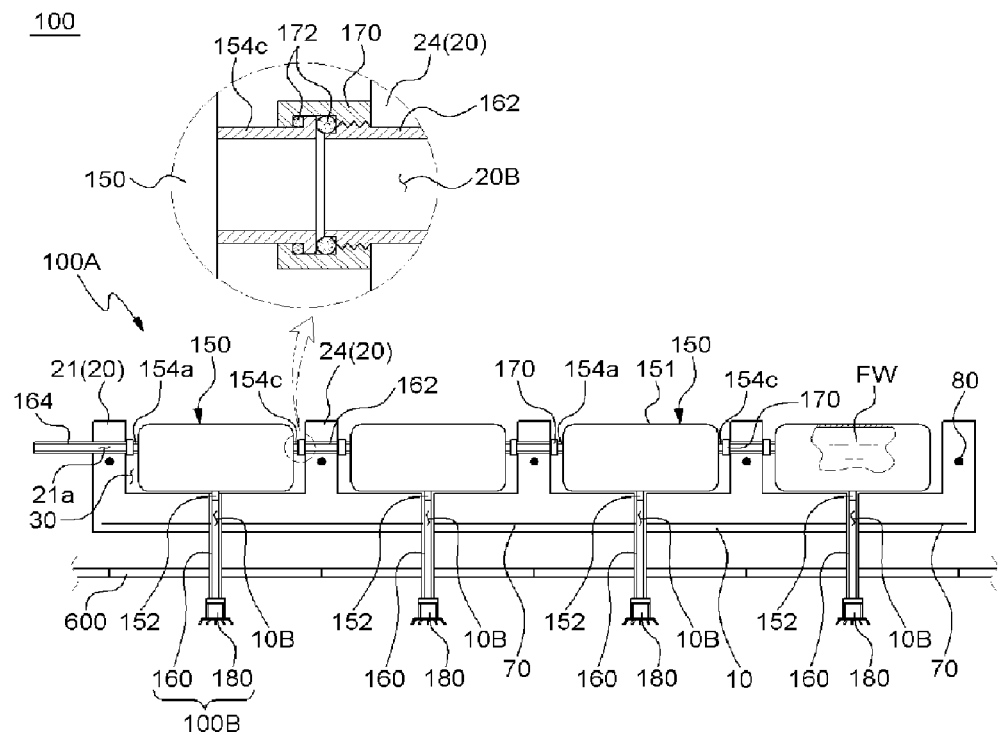
FIG. 13 is a cross-sectional configuration view of the concrete structure for constructing a building floor according to the second embodiment of the present invention, the view being taken along line C-C of FIG. 12.
Figure 14:
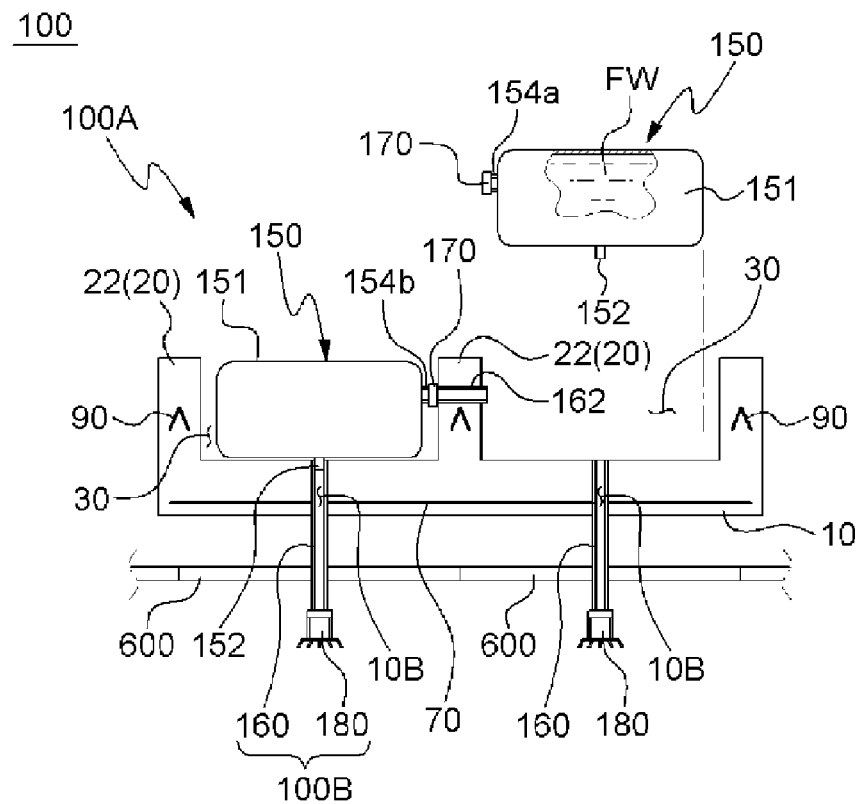
FIG. 14 is a cross-sectional configuration view of the concrete structure for constructing a building floor according to the second embodiment of the present invention, the view being taken along line D-D of FIG. 12.

FIG. 12 is a perspective view of the concrete structure 100 according to a second embodiment of the present invention. FIG. 13 is a cross-sectional view taken along line C-C of FIG. 12. FIG. 14 is a cross-sectional view taken along line D-D of FIG. 12.

Referring to FIGS. 12 to 14, as described above, the concrete main body 100A includes the base plate 10, the barrier 20 formed on the base plate 10, and a plurality of fire-extinguishing water cells 30 formed by the barrier 20. According to the second embodiment of the present invention, the fire-extinguishing water injection unit 100B further includes the fire-extinguishing water container 150 embedded and installed in the fire-extinguishing water cell 30. In this case, the fire-extinguishing water FW is injected into and stored in the fire-extinguishing water container 150.

In particular, according to the second embodiment of the present invention, the fire-extinguishing water injection unit 100B includes the fire-extinguishing water container 150 embedded and installed in the fire-extinguishing water cell 30 of the concrete main body 100A and storing the water fire FW, the fire-extinguishing water discharge pipe 160 to discharge the fire-extinguishing water FW stored in the fire-extinguishing water container 150, and the fire-extinguishing water injector 180 installed at an end of the fire-extinguishing water discharge pipe 160 to inject the fire-extinguishing water FW.

The fire-extinguishing water container 150 is waterproof, and is not particularly limited as long as it is capable of storing the fire-extinguishing water FW. The fire-extinguishing water container 150 may be made of, for example, a synthetic resin material, a metal material, and/or a fibrous material. In addition, the fire-extinguishing water container 150 may be made of a hard material or a soft material. In one embodiment, the fire-extinguishing water container 150 may be made of a flexible material.

As illustrated in FIGS. 12 to 14, the fire-extinguishing water container 150 is configured in plural, and is embedded and installed in each fire-extinguishing water cell 30. According to an exemplary embodiment, the fire-extinguishing water container 150 includes a container main body 151 and a fire-extinguishing water discharge part 152 disposed on a lower portion of the container main body 151. The fire-extinguishing water FW is injected into and stored in the container main body 151. The fire-extinguishing water discharge part 152 is connected to the fire-extinguishing water discharge pipe 160, and discharge the fire-extinguishing water FW stored in the container main body 151 downward to the fire-extinguishing water discharge pipe 160.

In addition, according to an embodiment of the present invention, the fire-extinguishing water container 150 may include at least one fire-extinguishing water introduction part 154a. The fire-extinguishing water introduction part 154a is formed on a side of the container main body 151, and the fire-extinguishing water FW may be introduced into and stored in the container main body 151 via the fire-extinguishing water introduction part 154a.

In addition, according to an embodiment of the present invention, the fire-extinguishing water container 150 may include at least one fire-extinguishing water supply parts 154b and 154c. The water supply parts 154b and 154c are formed on a side of the container main body 151, and the fire-extinguishing water FW may be discharged and supplied to another neighboring fire-extinguishing water container 150 via these water supply parts 154b and 154c. The water supply parts 154b and 154c may be provided in singular or plural, i.e., two or more. In particular, the fire-extinguishing water container 150 may include a first supply part 154b as the fire-extinguishing water supply part 154b, or a first supply part 154b and a second supply part 154c as the two fire-extinguishing water supply parts 154b and 154c. In this case, the first supply part 154b may be connected to the fire-extinguishing water flow path 20B (162) installed in the barrier 20, i.e., the transversal wall 22, to supply the fire-extinguishing water FW to another neighboring fire-extinguishing water container 150. In addition, the second supply part 154c may be connected to the fire-extinguishing water flow path 20B (162) installed in the barrier 20, i.e., the longitudinal wall 24, to supply the fire-extinguishing water FW to another neighboring fire-extinguishing water container 150.

Accordingly, the fire-extinguishing water FW may be injected into the container main body 151 via the fire-extinguishing water introduction part 154a, and another neighboring fire-extinguishing water container 150 may be supplied and filled with the fire-extinguishing water FW via the first supply part 154b and the second supply part 154c.

In addition, among the fire-extinguishing water containers 150, at least one fire-extinguishing water container 150 may be connected to the fire-extinguishing water inlet 164 installed on a side of the concrete main body 100A via the fire-extinguishing water introduction part 154a. In addition, among the fire-extinguishing water container 150, at least one fire-extinguishing water container 150 may be connected to the air discharge hole 166 installed on a side of the concrete main body 100A via the fire-extinguishing water introduction part 154a and/or the fire-extinguishing water supply parts 154b and 154c.

The fire-extinguishing water FW may be injected into and stored in the fire-extinguishing water container 150 after constructing the concrete main body 100A in a building. In this case, the fire-extinguishing water FW is injected via the fire-extinguishing water inlet 164 formed on a side of the concrete main body 100A, and is injected into and stored in the container main body 151 via the fire-extinguishing water introduction part 154a. In addition, when injecting the fire-extinguishing water FW, air present inside the container main body 151 passes through the fire-extinguishing water supply parts 154b and 154c, and then is discharged to the outside via the air discharge hole 166 of the concrete main body 100A, thereby facilitating the injection of the fire-extinguishing water FW.

In addition, when any one container main body 151 is filled with the fire-extinguishing water FW via the fire-extinguishing water inlet 164 and the fire-extinguishing water introduction part 154a, another neighboring fire-extinguishing water container 150 may be consecutively filled with the fire-extinguishing water FW along the flow path 20B via the fire-extinguishing water supply parts 154b and 154c. In addition, when all the fire-extinguishing water FW stored in the fire-extinguishing water container 150 has been used by fire suppression, each fire-extinguishing water container 150 may be filled and supplemented with the fire-extinguishing water FW through the above-described processes.

According to the second embodiment, when the fire-extinguishing water containers 150 are included, it is preferable in terms of injection/discharge properties of the fire-extinguishing water FW, storing/waterproof properties of the fire-extinguishing water FW, and the like. In particular, compared to a case in which the fire-extinguishing water FW is directly stored in the fire-extinguishing water cells, when the above-described fire-extinguishing water containers 150 are installed and the fire-extinguishing water FW is stored therein, the fire-extinguishing water FW may be smoothly injected and discharged, and filling the container main body 151 with the fire-extinguishing water FW is possible and thus a larger amount of the fire-extinguishing water FW may be stored, and waterproof properties of the container main body 151 may be secured.

According to an embodiment of the present invention, the fire-extinguishing water container 150 may be hermetically fastened with the connection pipe 162 and/or the fire-extinguishing water inlet 164 via a fastening member 170. Referring to FIG. 13, for example, the second supply part 154c of the fire-extinguishing water container 150 may be coupled to the connection pipe 162 installed in the barrier 20 via the fastening member 170. The fastening member 170 is not particularly limited as long as it is capable of coupling two members to each other with, for example, a screw structure. In FIG. 13, reference numeral S denotes a thread, and reference numeral 172 denotes a sealing material for hermetic sealing. The sealing material 172 may be selected from, for example, a waterproof rubber material, a waterproof silicon material, and/or a fibrous material, e.g., a rubber O-ring.

In addition, the first supply part 154b and the connection pipe 162, and the fire-extinguishing water introduction part 154a and the fire-extinguishing water inlet 164 may be fastened with each other via the above-described fastening member 170. In addition, in some cases, the fire-extinguishing water discharge part 152 and the fire-extinguishing water discharge pipe 160 may be hermetically coupled to each other via the above-described fastening member 170.

Third Embodiment

Figure 15:
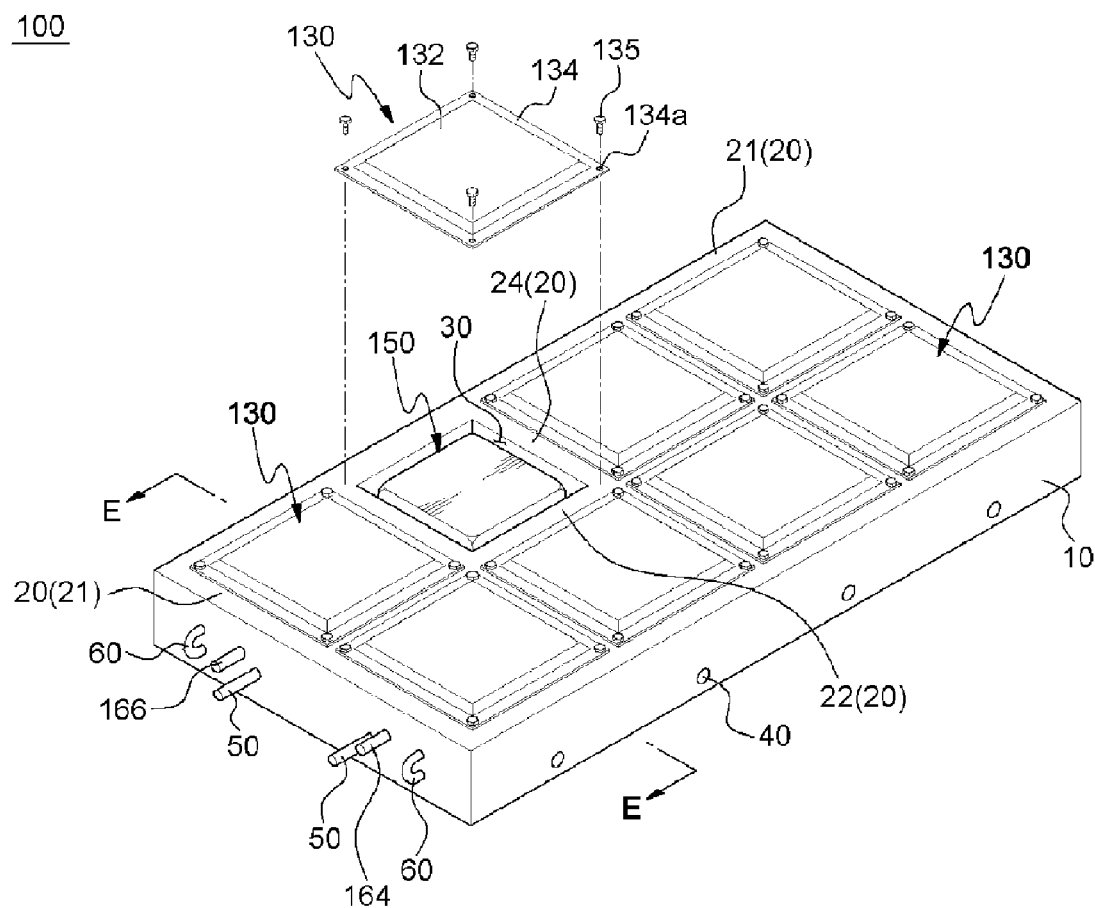
FIG. 15 is a perspective view of a concrete structure for constructing a building floor according to a third embodiment of the present invention.
Figure 16:
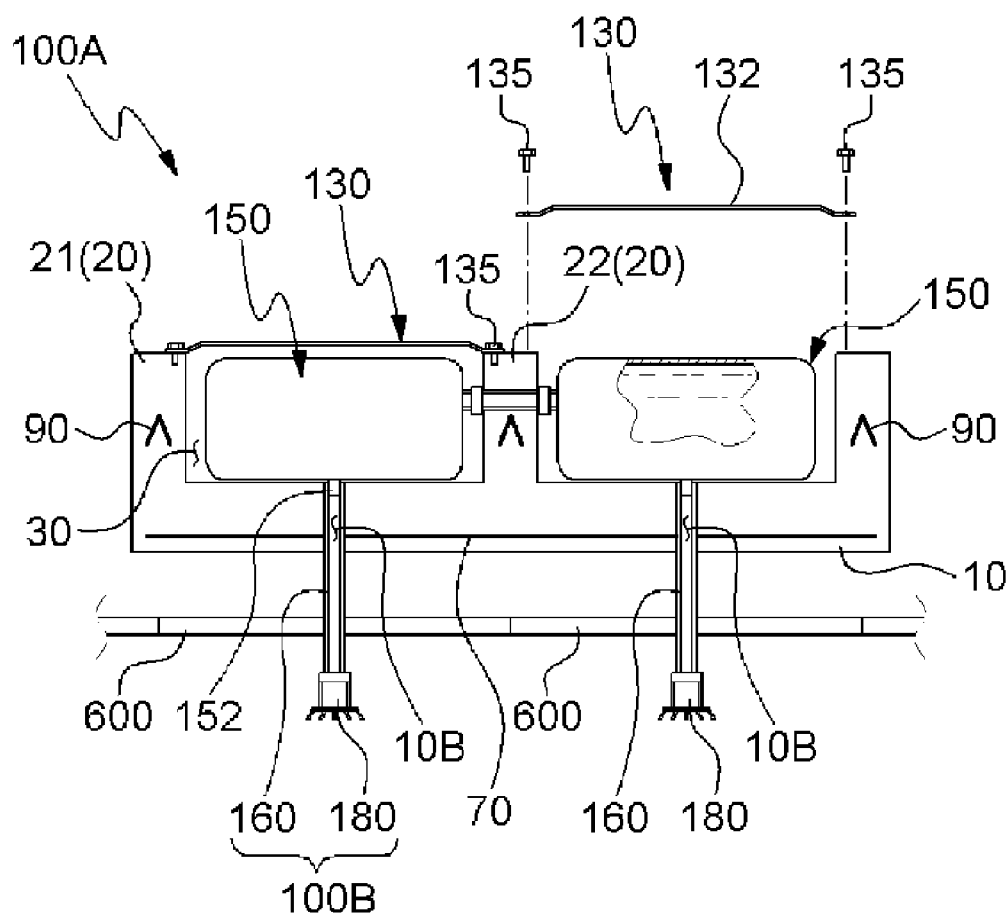
FIG. 16 is a cross-sectional configuration view of the concrete structure for constructing a building floor according to the third embodiment of the present invention, the view being taken along line E-E of FIG. 15.

FIG. 15 is a perspective view of the concrete structure 100 according to a third embodiment of the present invention. FIG. 16 is a cross-sectional view taken along line E-E of FIG. 15.

According to the third embodiment, the concrete structure 100 according to the present invention may further include a protective member 130 installed on an upper portion of each fire-extinguishing water cell 30. The protective member 130 is installed to protect the fire-extinguishing water cell 30 and/or the fire-extinguishing water container 150. In particular, the protective member 130 is installed to protect the fire-extinguishing water cell 30 and/or the fire-extinguishing water container 150 from impurities, load applied from the upper side, or the like. In one embodiment, a floor lamination FL (see FIG. 19) such as lightweight concrete, a thermal insulation material, a heating pipe, and/or a floor finishing material may be installed on an upper side of the fire-extinguishing water cells 30 and/or the fire-extinguishing water containers 150. The protective members 130 protect the fire-extinguishing water cells 30 and/or the fire-extinguishing water containers 150 from such a floor lamination FL.

In the present invention, the protective member 130 is not particularly limited as long as it is capable of protecting the first water cell 30 and/or the water fire container 150, and preferably has a good support strength. The protective member 130 may be made of, for example, a metal material, a concrete material, and/or a ceramic material, and may be able to support load applied from the upper side. The protective member 130 may be made of, for example, a metal material having a plate shape, a strip shape, and/or a bar shape. The protective member 130 may be installed, for example, on an upper portion of each fire-extinguishing water cell 30 and is one.

In addition, as illustrated in FIGS. 15 and 16, the protective member 130 may be selected from metal materials having a curved plate shape. According to one embodiment, the protective member 130 may be made of a plate-shaped metal material including a curved part 132 at a central region thereof and a fastening part 134 at an edge region thereof. According to another embodiment, for example, the protective member 130 may have a strip shape including the curved part 132 and the fastening part 134 as described above, and a plurality of strip-shaped protective members 130 may be installed on an upper portion of each fire-extinguishing water cell 30. The curved part 132 protrudes farther upward than the fastening part 134. The fastening part 134 is positioned on the barrier 20. In this case, the fastening portion 134 may be fixed to the barrier 20 via a fastener 135 such as an anchor bolt or the like. The fastening part 134 may be provided with at least one fastening hole 134a through which the fastener 135 passes.

Hereinafter, particular embodiments of a building floor construction structure (hereinafter, referred to as "floor construction structure") according to the present invention. In addition, in the following description of the floor construction structure according to the present invention, other embodiments of the concrete structure 100 according to the present invention may be described.

The floor construction structure according to the present invention may include one or two or more of the concrete structures 100 of the present invention as described above.

Figure 17:
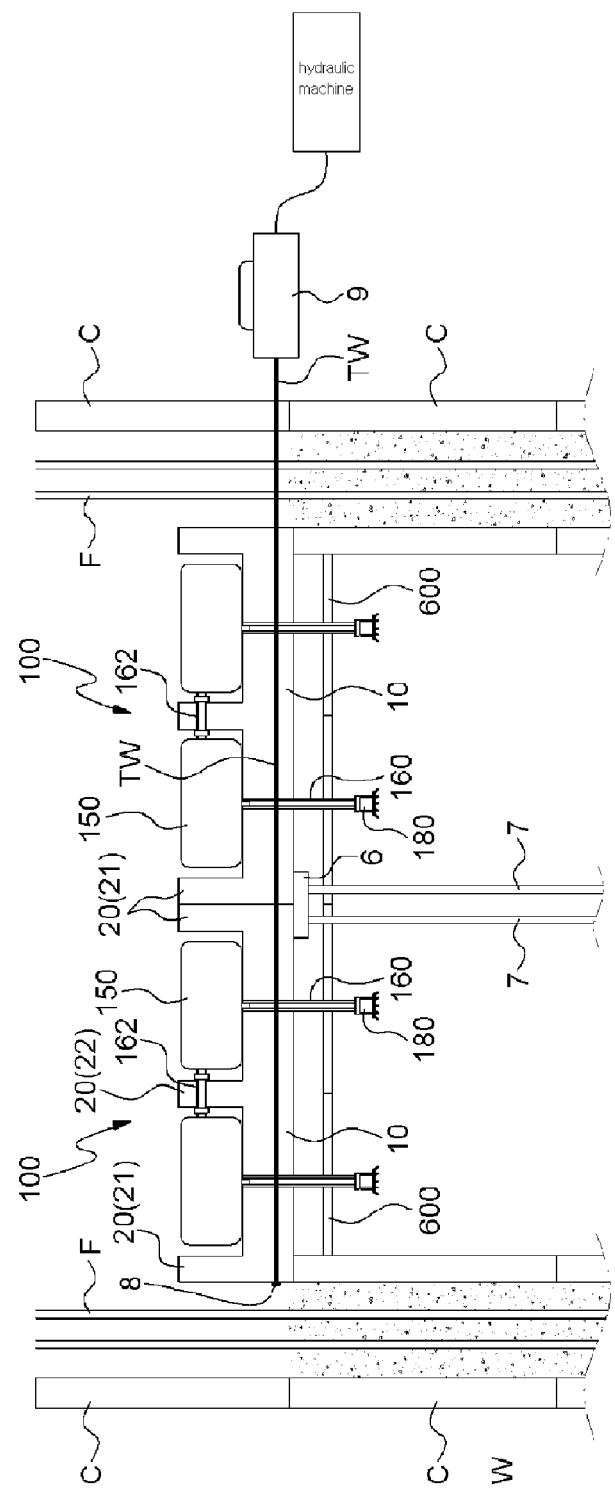
FIG. 17 is a cross-sectional configuration view for explaining a process of installing a concrete structure for constructing a building floor according to the present invention.
Figure 18:
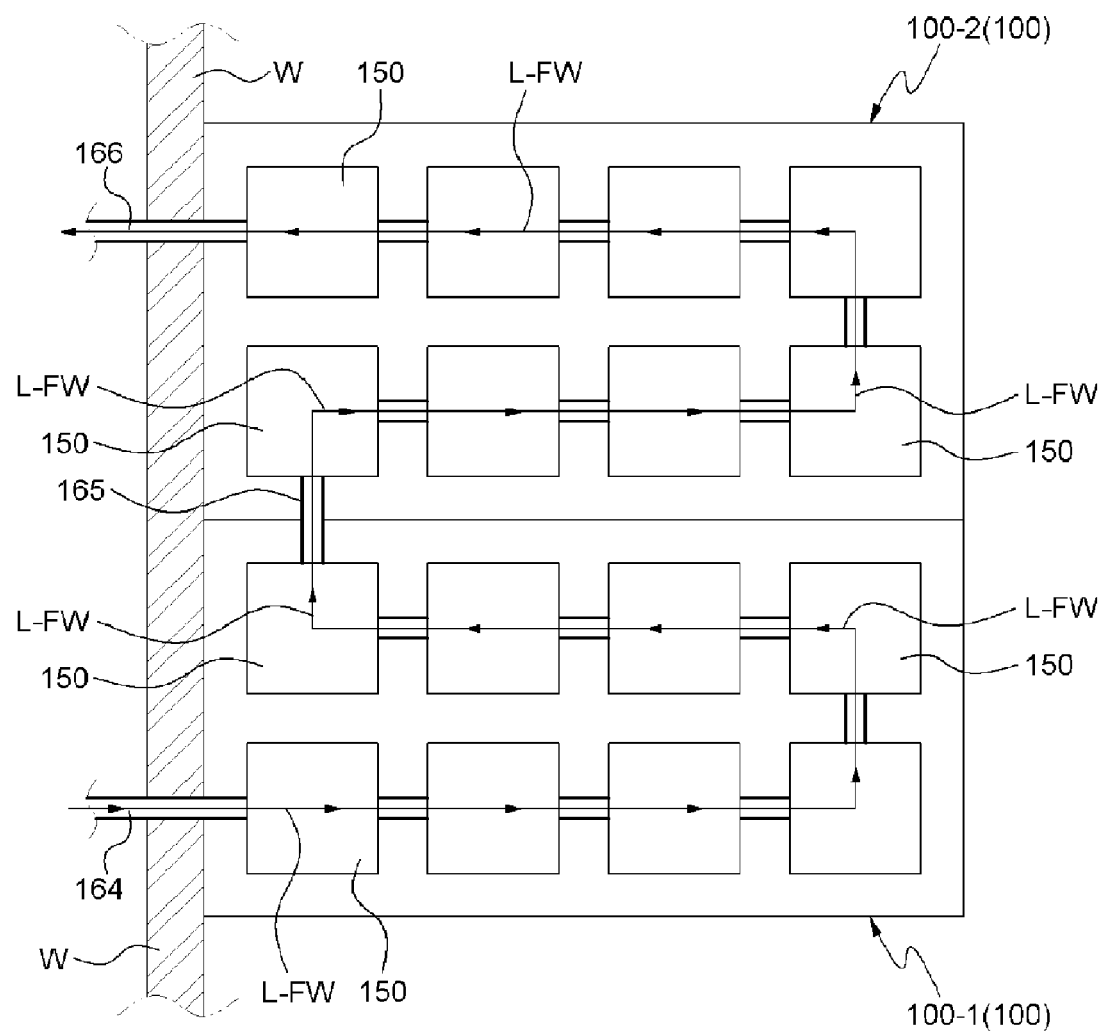
FIG. 18 is a plan view for explaining a process of installing a concrete structure for constructing a building floor according to the present invention.
Figure 19:
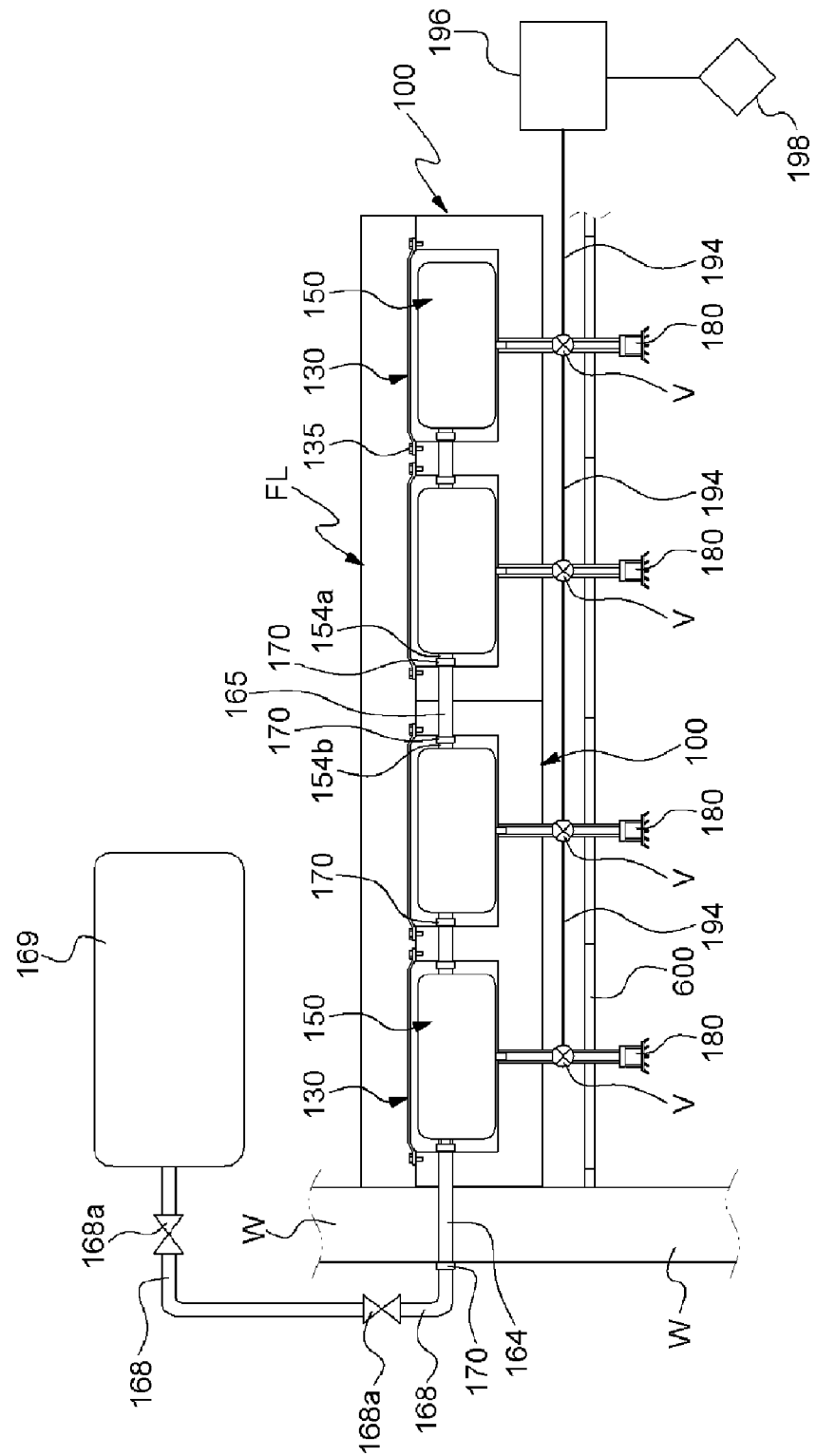
FIG. 19 is a cross-sectional configuration view of a building floor construction structure according to a first embodiment of the present invention.

FIGS. 17 to 19 illustrate a floor construction structure according to the present invention. FIG. 17 is a cross-sectional view for explaining a process of installing the concrete structure 100. FIG. 18 is a plan view. FIG. 19 is a cross-sectional configuration view of a floor construction structure according to a first embodiment of the present invention.

First, referring to FIG. 17, a wall W of a building may be generally constructed via a cast C, or may be constructed by a pre-casting (PC) method. FIG. 17 illustrates a process of constructing the wall W via a cast C. In particular, to construct the wall W, an inner cast C and an outer cast C are installed. A plurality of iron bars F is installed between the inner cast C and the outer cast C, and the iron bars F are coupled to one another by wires. Subsequently, concrete is cast between the inner and outer casts C and cured to construct the wall W. In this case, the concrete structure 100 is installed between a left wall W and a right wall W to construct a floor. For example, the concrete structure 100 is provided in plural such that two or more concrete structures 100 are installed parallel to each other. In some cases, a horizontal state maintaining plate 6 may be installed to support the horizontal state of the concrete structures 100, and a support frame 7 may be installed to support the horizontal state maintaining plate 6. In this case, as illustrated in FIG. 17, the horizontal state maintaining plate 6 may be installed on a lower portion of the concrete structures 100, and the support frame 7 may be installed on a lower side of the horizontal state maintaining plate 6 to perform a support function.

The concrete structures 100 are fastened with each other via the tension wire TW. In particular, as described above, the concrete structure 100 has the through-holes 40, and, the tension wire TW is inserted into these through-holes 40, and then tension is applied to any one side, thereby completing the fastening process. That is, as illustrated in FIG. 17, one end of the tension wire TW is fixed to one side (left side in FIG. 17) of the concrete structure 100 positioned on a left side via a fixing member 8 such as a tension cone, or the like, and then finished. In addition, when the concrete structures 100 are fixed to the iron bars F after applying strong tension thereto by stretching another end of the tension wire TW using a tensioner 9 on one side (right side in FIG. 17) of the concrete structure 100 positioned on a right side, the concrete structures 100 may be rigidly fastened with each other. In this case, the tensioner 9 may be connected to a hydraulic machine or the like to apply strong tension.

In the present invention, the tension wire TW is not particularly limited as long as it has an appropriate strength, and may be, for example, an iron bar or, preferably, a twisted structure composed of a plurality of steel wires. An end of the tension wire TW may be rigidly fastened to the iron bars F embedded in the wall W via welding or the like. As such, after fastening the concrete structures 100 with each other via the tension wire TW, the inserts 50 installed on the side surface of the concrete structure 100 may be welded to the iron bars F of the wall W or may be fastened therewith via a separate fastener, thereby providing higher binding strength.

The above-described process of installing the concrete structures 100 has been described for a case in which two or more floors of a building are constructed. In the case of the bottom floor of the building, an installation structure of the horizontal state maintaining plate 6 and the support frame 7 may be omitted. In addition, the concrete structure 100 constructed as described above corresponds to a floor for a resident living on an upper floor and a ceiling for a resident living on a lower floor.

FIG. 18 is a plan view illustrating a state in which two concrete structures 100, i.e., first and second concrete structures 100-1 and 100-2, are fastened with each other. As described above, the fire-extinguishing water inlet 164 and/or the air discharge hole 166 may be installed on side surfaces of the first and second concrete structures 100-1 and 100-2 (100). As illustrated in FIG. 18, in the first and second concrete structures 100-1 and 100-2 (100), the fire-extinguishing water inlet 164 may be installed in the first concrete structure 100-1, and the air discharge hole 166 may be installed in the second concrete structure 100-2 (100). In addition, the fire-extinguishing water inlet 164 and/or the air discharge hole 166 may pass through the wall W and be exposed to the outside.

In addition, the concrete structures 100, i.e., the first and second concrete structures 100-1 and 100-2, may be connected to each other. In particular, as illustrated in FIG. 18, the first and second concrete structures 100-1 (100) and 100-2 (100) may be connected to each other via a connection flow path 165. In this case, the connection flow path 165 is connected to any one of the fire-extinguishing water containers 150 installed in the first concrete structure 100-1 (100) and any one of the fire-extinguishing water containers 150 installed in the second concrete structure 100-2 (100). Accordingly, when the fire-extinguishing water FW is injected via the fire-extinguishing water inlet 164 installed in the first concrete structure 100-1 (100), each fire wall container 150 of the first concrete structure 100-1 (100) is filled with the fire-extinguishing water FW, and then the fire-extinguishing water FW is continuously supplied to the second concrete structure 100-2 (100) along the connection flow path 165 to fill each fire-extinguishing water container 150 of the second concrete structure 100-2 (100). In FIG. 18, an arrow denoted as reference numeral L-FW represents flow of the fire-extinguishing water FW. In addition, in the process of injecting the fire-extinguishing water FW, air present in each fire-extinguishing water container 150 is discharged to the outside via the air discharge hole 166 installed in the second concrete structure 100-2 (100). After each fire-extinguishing water container 150 is filled with the fire-extinguishing water FW via the fire-extinguishing water inlet 164, a sealing cap (not shown) may be coupled to the fire-extinguishing water inlet 164 and/or the air discharge hole 166 and finished.

Meanwhile, when all the fire-extinguishing water FW stored in the fire-extinguishing water containers 150 is consumed for fire suppression, each fire-extinguishing water container 150 may be filled and supplemented with the fire-extinguishing water FW. In this case, as illustrated in FIG. 19, the fire-extinguishing water FW may be supplemented via a fire-extinguishing water supply line 168. One side of the fire-extinguishing water supply line 168 is connected to the fire-extinguishing water inlet 164 via the fastening member 170. An opening/closing valve 168a may be installed in the fire-extinguishing water supply line 168. In one embodiment, the fire-extinguishing water supply line 168 may be connected to a fire-extinguishing water bath 169 installed on a rooftop to supplement the fire-extinguishing water containers 150 with the fire-extinguishing water FW stored in the fire-extinguishing water bath 169.

Referring to FIG. 19, the floor construction structure according to the present invention includes the concrete structure 100 installed to have the above-described structure, and may further include a floor lamination FL installed on the concrete structure 100. The floor lamination FL may be selected from lightweight concrete, a thermal insulation material, a heating pipe, a mortar layer, a plaster layer, and/or a floor finishing material. In one embodiment, the floor lamination may include a thermal insulation material installed on the concrete structure 100, a mortar layer formed on the thermal insulation material, a heating pipe arranged and embedded in the mortar layer, a plaster layer formed on the mortar layer, and a floor finishing material (floor pad, or the like) installed on the plaster layer.

When a fire occurs, the fire-extinguishing water injection unit 100B installed in the concrete structure 100 injects the fire-extinguishing water FW towards a fire outbreak site. In the present invention, operation of the fire-extinguishing water injection unit 100B, i.e., injection of the fire-extinguishing water FW, is not particularly limited, and includes automatic operation and/or manual operation. For example, the fire-extinguishing water FW may be injected by operation (opening) of the opening/closing valve V installed in the fire-extinguishing water discharge pipe 160, and/or operation (opening) of the fire-extinguishing water injector 180. In addition, the fire-extinguishing water injection unit 100B may inject the fire-extinguishing water FW in accordance with general fire extinguishment equipment. For example, the fire-extinguishing water injection unit 100B may inject the fire-extinguishing water FW in cooperation with a fire sensor (a heat sensor and/or a smoke sensor) installed in general fire extinguishment equipment, an alarm, and/or a controller. In addition, the operation (opening) of the fire-extinguishing water injection unit 100B, i.e., operation (opening) of the opening/closing valve V, and/or operation (opening) of the fire-extinguishing water injector 180, may be performed via a remote control from, e.g., a control station (a building management station, a fire station, or the like).

According to one embodiment, the opening/closing valve V is installed at the fire-extinguishing water discharge pipe 160, and the opening/closing valve V may be operated automatically and/or manually. For example, the opening/closing valve V may be selected from solenoid valves electrically operated. In addition, a gear-type or chain-type actuator 194 may be connected to the opening/closing valve V, and the actuator 194 may be operated by a motor 196. In addition, the motor 196 is controlled by an operating switch 198, the actuator 194 is operated by the motor 196 when the operating switch 198 is pressed when a fire occurs, and the opening/closing valve V is opened by the actuator 194, thereby injecting the fire-extinguishing water FW via the fire-extinguishing water discharge hole 180. In this case, the fire-extinguishing water FW may be injected according to each floor or according to generation living on each floor. In addition, the fire-extinguishing water FW may be independently injected according to units of the concrete structure 100 and/or the fire-extinguishing water container 150.

In the present invention, the fire-extinguishing water injector 180 is not particularly limited as long as it is capable of injecting the fire-extinguishing water FW. As described above, the fire-extinguishing water injector 180 may be selected from sprinkler heads used in general sprinkler equipment. The fire-extinguishing water injector 180 includes, for example, a heat reaction part 185 (see FIG. 20), and thus the heat reaction part 185 may be melt or broken by heat generated by fire, thereby providing a structure capable of injecting the fire-extinguishing water FW.

Figure 20:
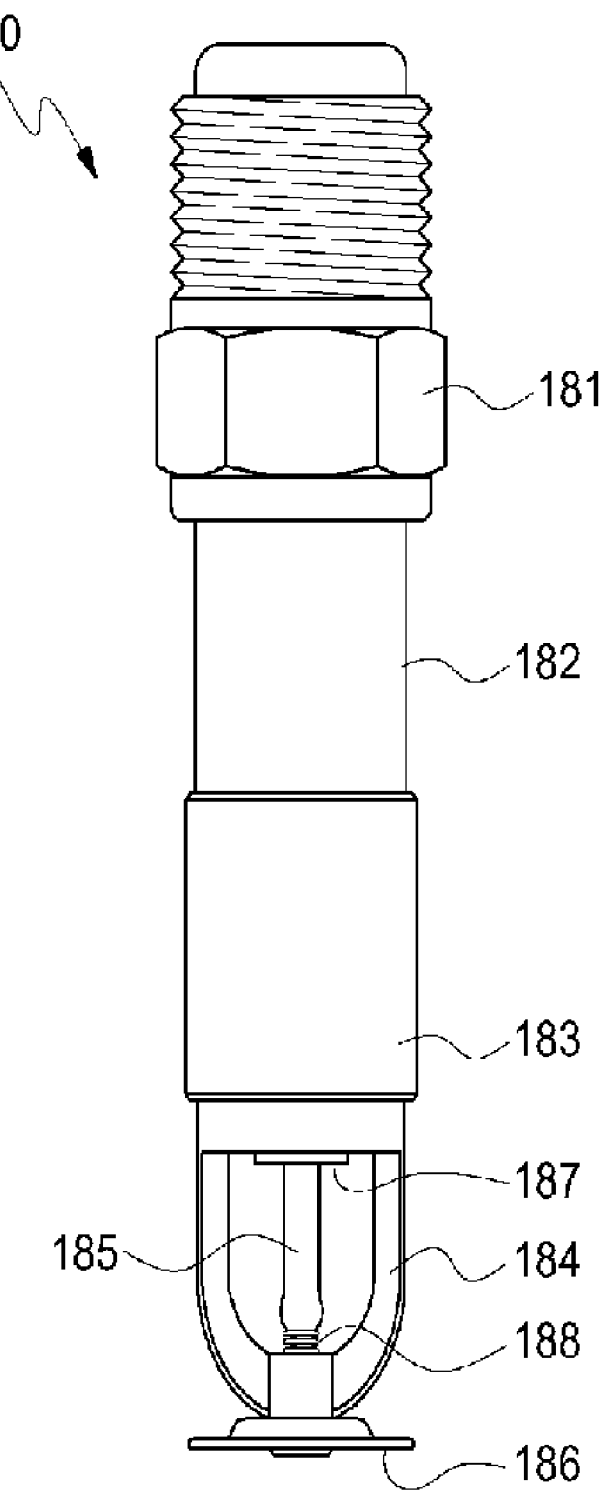
FIG. 20 is a cross-sectional view illustrating an embodiment of a fire-extinguishing water sprayer used in the present invention.

FIG. 20 is a configuration view illustrating an exemplary embodiment of the fire-extinguishing water injector 180.

Referring to FIG. 20, according to one embodiment, the fire-extinguishing water injector 180 may include an adapter 181 fastened with the fire-extinguishing water discharge pipe 160, a support tube 182 positioned on a lower portion of the adapter 181, a socket 183 installed on a lower portion of the support tube 182, a support frame 184 installed on a lower portion of the socket 183, a deflector 186 coupled to a lower portion of the support frame 184, the heat reaction part 185 installed inside the support frame 184, and a valve 187 installed at an upper portion of the heat reaction part 185. A support member 188 may be installed at a lower portion of the heat reaction part 185.

The heat reaction part 185 may be made of, for example, a hot melt material selected from metals (e.g., lead (Pb) or the like) capable of being melt by heat and having a low melting point, a glass bulb capable of being broken by heat, or the like. Thus, when a fire occurs, the heat reaction part 185 is melted or broken by heat due to the fire, and thus the valve 187 escapes from the original position, and the fire-extinguishing water FW is injected by water pressure.

As another example, electric wiring is installed in the heat reaction part 185, and the electric wiring may be connected to a fire sensor and/or a controller. In addition, when a fire occurs, fire information sensed by the fire sensor is transmitted to the controller, the controller controls electricity to be applied to the heat reaction part 185 via the electric wiring, and thus the heat reaction part 185 is melt or broken by electrical resistance heat, and, as a result, the fire-extinguishing water FW may be injected.

Figure 21:
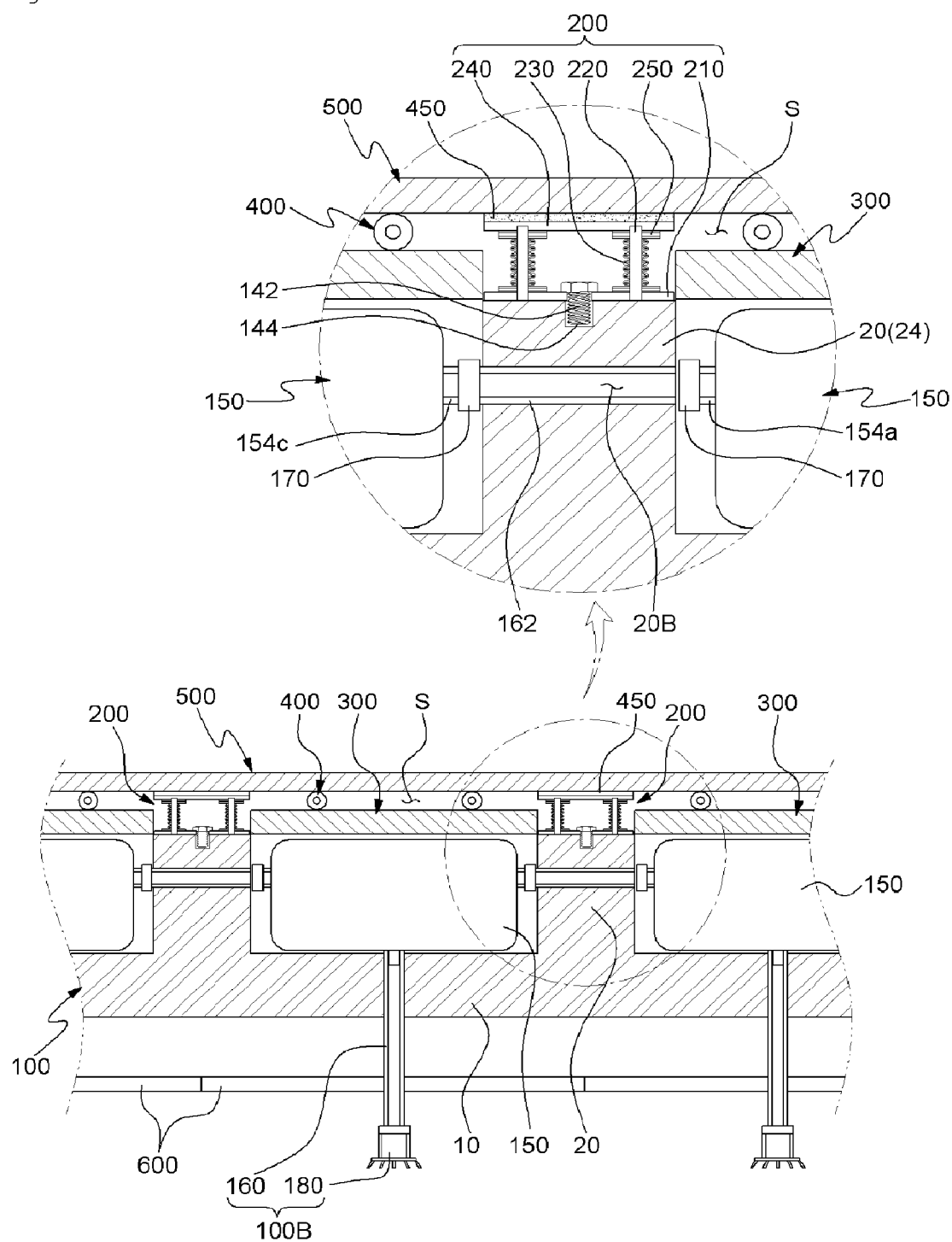
FIG. 21 is a cross-sectional configuration view of a building floor construction structure according to a second embodiment of the present invention.
Figure 22:
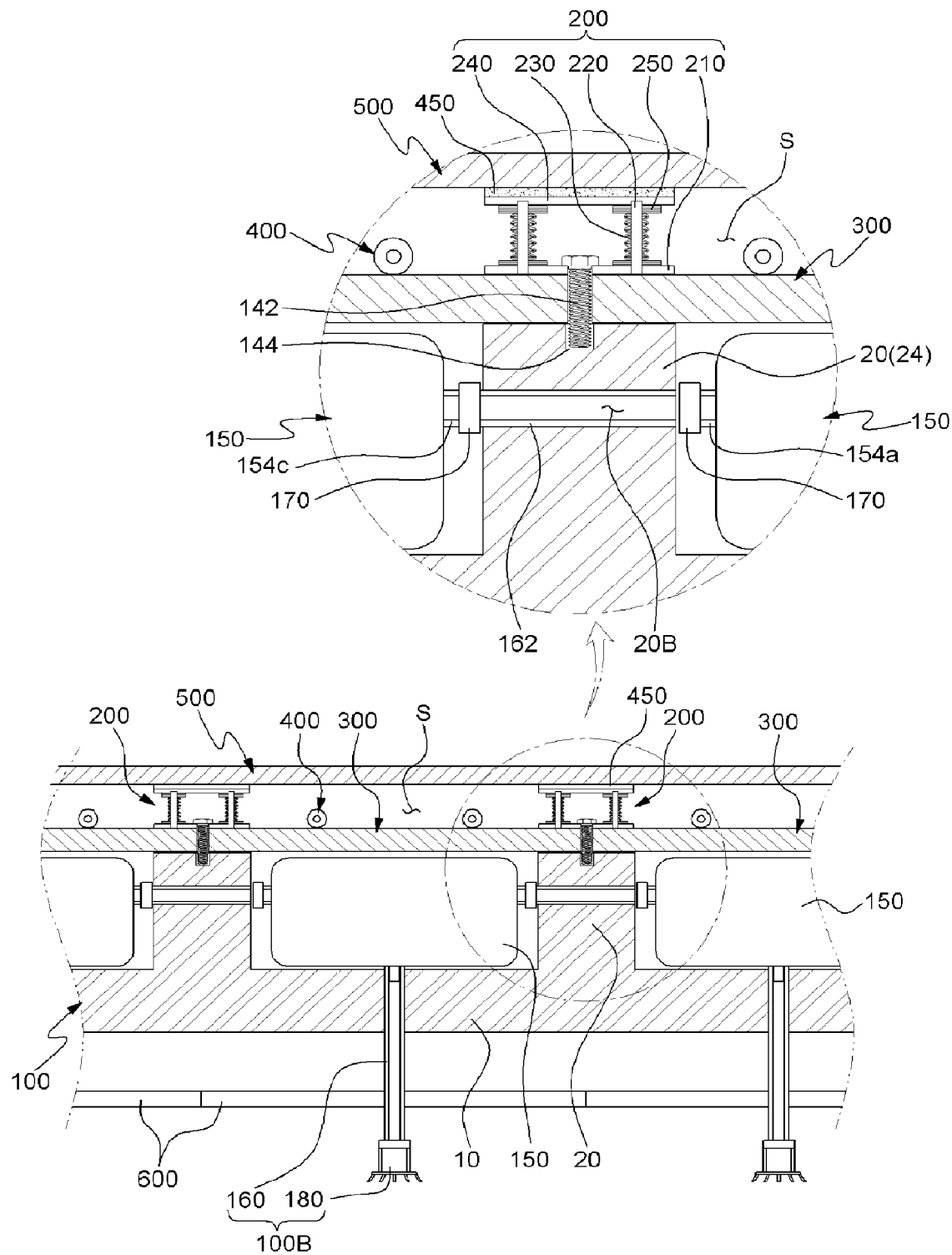
FIG. 22 is a cross-sectional configuration view of a building floor construction structure according to a third embodiment of the present invention.

FIG. 21 is a cross-sectional view illustrating essential parts of a second embodiment of a floor construction structure according to the present invention. FIG. 22 is a cross-sectional view illustrating essential parts of a third embodiment of a floor construction structure according to the present invention.

Referring to FIGS. 21 and 22, the floor construction structure according to the present invention may include the above-described concrete structure 100, and a thermally conductive metal plate 500 on the concrete structure 100 to be spaced apart therefrom. In this case, the concrete structure 100 and the thermally conductive metal plate 500 may be spaced apart from each other by impact absorption units 200 with a predetermined interval therebetween. In addition, a thermal insulation material 300 and/or a heating pipe 400 may be installed between the concrete structure 100 and the thermally conductive metal plate 500.

According to one embodiment, the floor construction structure according to the present invention may include the concrete structure 100, a plurality of impact absorption units 200 installed on the concrete structure 100, the thermally conductive metal plate 500 installed on the impact absorption units 200, the thermal insulation material 300 installed on the concrete structure 100, and the heating pipe 400 installed between the thermal insulation material 300 and the thermally conductive metal plate 500. In this case, the impact absorption units 200 may directly contact an upper surface of the concrete structure 100 (see FIG. 21), or may directly contact an upper surface of the thermal insulation material 300 (see FIG. 22).

Referring to FIG. 21, the impact absorption units 200 may directly contact the upper surface of the concrete structure 100, and the thermal insulation material 300 may directly contact the concrete structure 100 in the vicinity of these impact absorption units 200. In addition, referring to FIG. 22, the impact absorption units 200 may directly contact the upper surface of the thermal insulation material 300. In particular, the thermal insulation material 300 may be installed in direct contact with the upper surface of the concrete structure 100, and the impact absorption units 200 may be installed in direct contact with the upper surface of the thermal insulation material 300. In addition, an empty space S arranged between the heating pipes 400 may be filled with a separate packing material. In another embodiment, the empty space S may be maintained as an air layer. The packing material is used for thermal insulation properties and/or sound insulation properties, and may be, for example, a generally used thermal insulation material or a porous filling material. The porous filling material has a plurality of pores and may be selected from, for example, foamed concrete and/or a synthetic resin foam.

The impact absorption units 200 are installed between the concrete structure 100 and the thermally conductive metal plate 500 to separate the concrete structure 100 and the thermally conductive metal plate 500 from each other with a predetermined interval therebetween. In addition, the impact absorption units 200 not only separate the thermally conductive metal plate 500 from the concrete structure 100, but also absorb and buffer impact applied from the upper side, thereby effectively blocking noise and vibration. In this case, the impact absorption units 200 may be fixed to the barrier 20 of the concrete structure 100.

FIGS. 23 to 26 illustrate embodiments of the impact absorption units 200.

Figure 23:
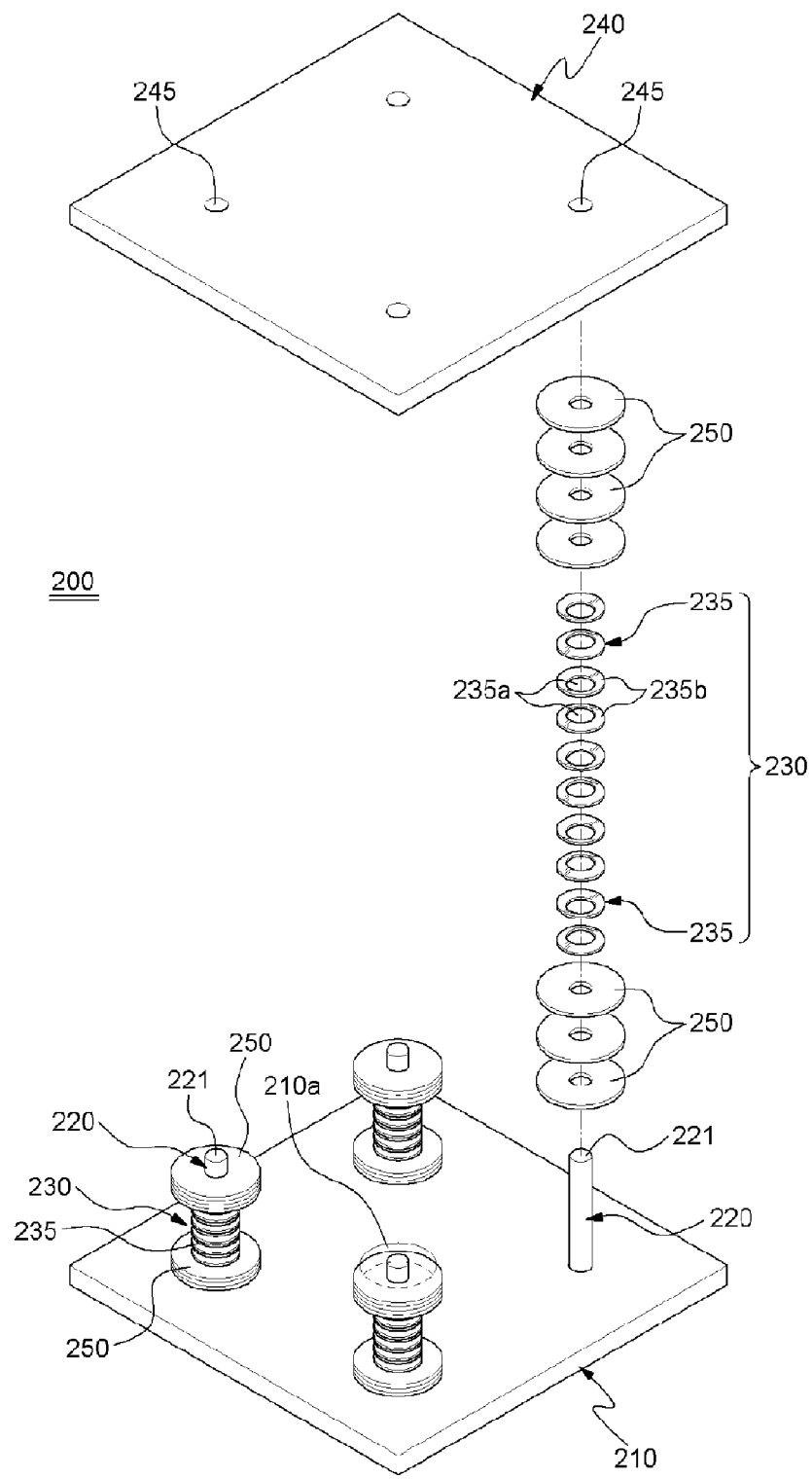
FIG. 23 is an exploded perspective view illustrating a first embodiment of an impact absorption unit according to the present invention.

First, referring to FIG. 23, the impact absorption unit 200 includes: a first substrate 210; a support rod 220 installed on the first substrate 210; a buffer member 230 inserted into the support rod 220 and having elasticity; and a second substrate 240 installed on the buffer member 230. In this case, the impact absorption unit 200 includes a plurality of support rods 220 to provide stability. The impact absorption unit 200 having such a structure effectively absorbs and buffers impact applied from the upper side, thereby blocking noise and vibration. Each of the elements constituting the impact absorption unit 200 may be selected from, for example, metal materials and/or plastic materials, and the materials thereof are not particularly limited.

The first substrate 210 has a circular or polygonal (tetragonal or the like) plate shape, and is fixed to an upper portion of the concrete structure 100. In particular, referring to FIGS. 21 to 23, the first substrate 210 may be fixed to the barrier 20 of the concrete structure 100. The first substrate 210 may be fixed to the concrete structure 100 via, for example, an anchor bolt 142. For this configuration, the first substrate 210 may have a bolt hole 210a through which the anchor bolt 142 is inserted. More particularly, at least one bolt hole 210a is formed in the first substrate, and an anchor insert 144 is embedded in the barrier 20 of the concrete structure 100. The anchor bolt 142 passes through the bolt hole 210a, and is then fastened to the anchor insert 144 so that the first substrate 210 can be fixed to the concrete structure 100.

The support rod 220 is provided in plural as described above to provide stability. That is, the support rods 220 are installed on the first substrate 210. For example, three to six support rods 220 may be installed on the first substrate 210, and the drawings illustrate a state in which four support rods 220 are arranged and installed with predetermined intervals therebetween. The support rods 220 may have, for example, a cylindrical shape, a polygonal pillar shape, or the like.

The buffer member 230 has elasticity, and is inserted into and installed in each support rod 220 to provide buffer capacity for absorbing impact. The buffer member 230 is not limited as long as it has elasticity. In this case, when impact is applied to upper portions of the impact absorption units 200, the buffer member 230 may have a contraction (buffer) length of about 0.1 mm to about 4 mm. More particularly, when impact is applied from the upper side (upper floor), the buffer member 230 contracts (buffers). At this time, the buffer member 230 may have a contraction force (buffer force) of about 0.1 mm to about 4 mm due to impact load.

For example, assuming that a total length (height) of the buffer member 230 before impact is applied is about 5 cm (=50 mm) (initial length=about 5 cm), the buffer member 230 is contracted by about 0.1 mm to about 4 mm due to the impact load applied from the upper side, and a post-contraction length (height) of the buffer member 230 may range from about 46 mm to about 49.9 mm. In this case, when the contraction length (contraction force) is less than 0.1 mm, an impact absorbing function (buffer function) may be insignificant. On the other hand, when the contraction length (contraction force) is greater than 4 mm, i.e., when contraction of the buffer member 230 may be excessive, vibration may be transmitted to a user, and thus it is not preferable. In consideration of this fact, the contraction length of the buffer member 230 may range from 0.5 mm to 3.5 mm, or from 1 mm to 3 mm. When a buffer function implements within the above range, an excellent impact absorbing function (buffer function) may be obtained and contraction (buffer) vibration may not be transmitted to a user. In this regard, the impact load refers to an arbitrary impact load that may be applied from the upper side after completing floor construction, and is not particularly limited. In one embodiment, the impact load may be an impact load that may be applied when a user with a body weight of 100 kg jumps from the ground by a height of about 30 cm.

Figure 24:
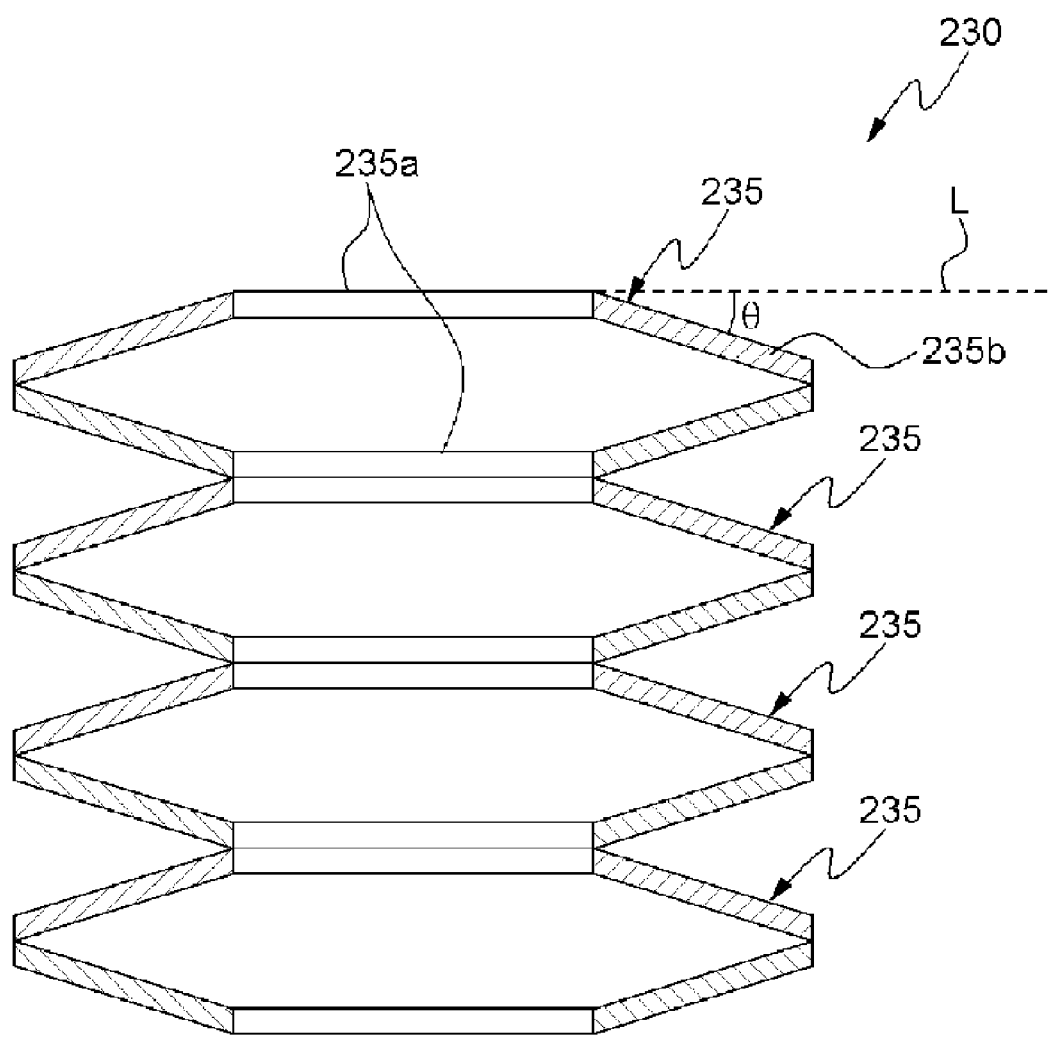
FIG. 24 is a cross-sectional configuration view illustrating an embodiment of a buffer member constituting the impact absorption unit according to the present invention.

In the present invention, the buffer member 230 is not limited as long as it has a contraction force within the above-described range, and may include, for example, a coil-type spring (spring structure) or a plurality of flange members 235. According to an exemplary embodiment, the buffer member 230 is selected from the flange members 235. FIG. 24 illustrates a cross-sectional configuration view of the buffer member 230 including the flange members 235, according to an exemplary embodiment.

Referring to FIG. 24, the buffer member 230 may be, in particular, an elastic structure in which the flange members 235 are stacked. The flange members 235 may be an elastic metal member or an elastic plastic member, and, in particular, may be made of a metal material such as carbon steel, stainless steel (SUS), aluminum alloy steel, steel, or the like.

The flange members 235 have a buffer hole 235a at a center thereof, and the support rod 220 is inserted into the buffer hole 235a. More particularly, the flange members 235 includes the buffer hole 235a at the center thereof, through which the support rod 220 is inserted, and elastic discs 235b formed in a circumferential direction with respect to the buffer hole 235a. In this case, as illustrated in FIG. 24, the elastic discs 235b are inclined at a predetermined angle θ with respect to a horizontal baseline L to have an umbrella shape. The elastic discs 235b are not particularly limited, but may be inclined to have an angle θ of, for example, about 2° to about 45° with respect to the horizontal baseline L.

The buffer member 230 may be configured such that the flange members 235 are stacked. In this case, referring to FIG. 24, the buffer member 230 may be configured such that two flange members 235 are stacked in opposite directions to form a single elastic set, and one elastic set or two or more elastic sets are stacked. FIG. 24 illustrates the buffer member 230 including a total of 8 flange members 235 configured such that two flange members 235 stacked in opposite directions form a single elastic set, and 4 elastic sets are vertically stacked. Thus, when impact is applied from the upper side, the umbrella-shaped flange members 235, i.e., the umbrella-shaped elastic discs 235b inclined at a predetermined angle θ, stretch (spread), thereby absorbing and buffering the applied impact. These flange members 235 more stably absorb (buffer) impact than coil-type springs, and are structurally rigid, and thus are suitable for the present invention.

In addition, referring to FIGS. 21 to 23, the second substrate 240 is installed on the buffer members 230 to support the thermally conductive metal plate 500. In this case, the second substrate 240 has a circular or polygonal (tetragonal or the like) plate shape, and is provided with a guide hole 245. That is, the guide hole 245 through which an upper end 221 of the support rod 220 is inserted is formed in the second substrate 240. The guide hole 245 is provided in plural, and the number of the guide holes 245 may be the same as the number of the support rods 220. For example, as illustrated in FIG. 23, when the number of the support rods 220 is 4, the number of the guide holes 245 may also be 4. Thus, when impact is applied from the upper side, the second substrate 240 may vertically move along the support rods 220.

Figure 25:
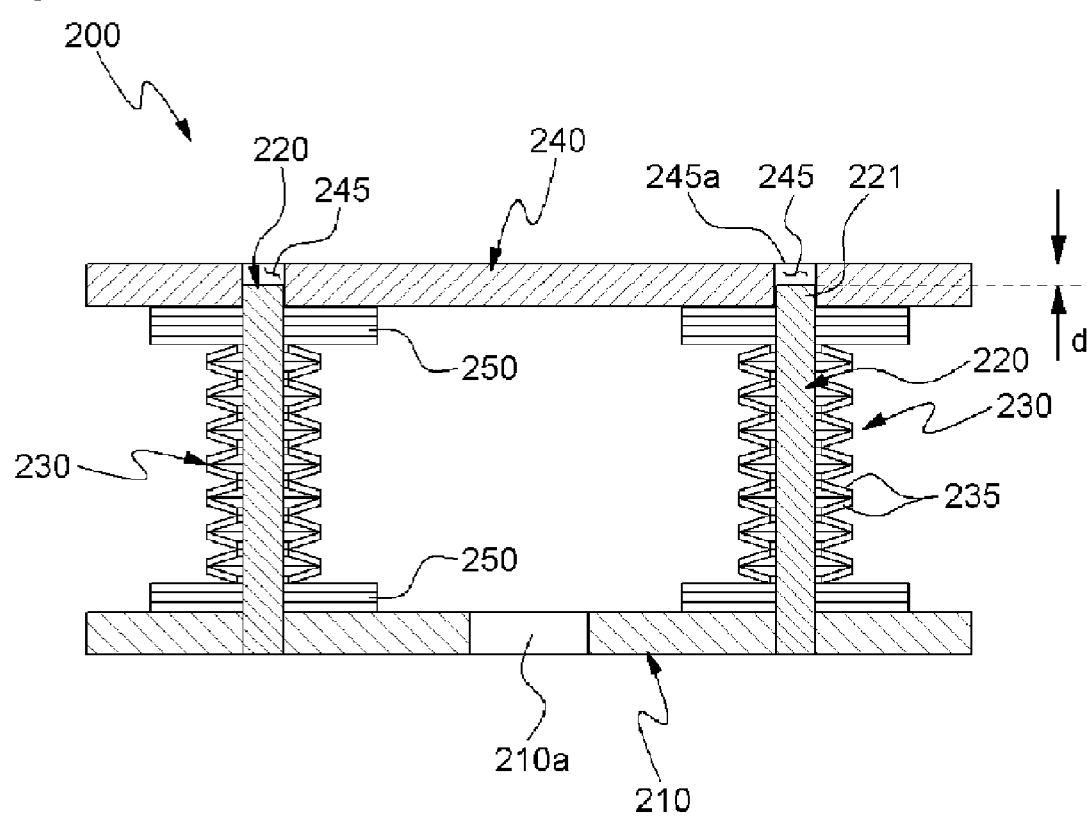
FIG. 25 is a cross-sectional configuration view illustrating a first embodiment of an impact absorption unit according to the present invention.

In addition, referring to FIG. 25, the upper end 221 of the support rod 220 may be inserted into the guide hole 245 of the first substrate 240 to have a step d therebetween. In particular, the upper end 221 of the support rod 220 may be positioned to have a step d by a predetermined distance from an end 245a of the guide hole 245. For example, when a strong impact is applied from the upper side of the second substrate 240, the upper end 221 of the support rod 220 escapes from the guide hole 245 by contraction of the buffer member 230, and thus may press the thermally conductive metal plate 500 positioned thereabove. The step d may prevent such a phenomenon. That is, when a strong impact is applied to the second substrate 240, the step d may form an extra exit, thereby preventing contact between the upper end 221 of the support rod 220 and the thermally conductive metal plate 500. The step d may be formed to a distance of, for example, 0.2 mm to 6 mm. In another embodiment, the step d may be formed to a distance of 0.5 mm to 4 mm. In particular, when impact is applied, the upper end 221 of the support rod 220 may move in the guide hole 245 within a range of 0.2 mm to 6 mm (or 0.5 mm to 4 mm).

Referring to FIGS. 23 and 25, according to an exemplary embodiment of the present invention, the impact absorption unit 200 may further include a height adjustment member 250. The height adjustment member 250 is installed at one or more positions selected from a position between the first substrate 210 and the buffer member 230, and a position between the second substrate 240 and the buffer member 230. The height adjustment member 250 is used to adjust a horizontal state between the impact absorption units 200.

The impact absorption unit 200 may be provided in plural on the concrete structure 100. In some cases, the concrete structures 100 may not form a horizontal state therebetween. In this case, at least the horizontal state between the impact absorption units 200 may be adjusted by the height adjustment member 250. The height adjustment member 250 may have, for example, a ring shape, and is inserted into and installed in the support rod 220. For this configuration, the height adjustment member 250 may be provided, at a center thereof, with an insertion hole 255 through which the support rod 220 is inserted. In one embodiment, the height adjustment member 250 may be provided in singular or in plural. The number of the height adjustment members 250 may be determined according to a height deviation. That is, an appropriate number of the height adjustment members 250 may be installed between the first substrate 210 and the buffer member 230, and/or between the second substrate 240 and the buffer member 230 according to height deviation between the impact absorption units 200 to perform height adjustment.

Figure 26:
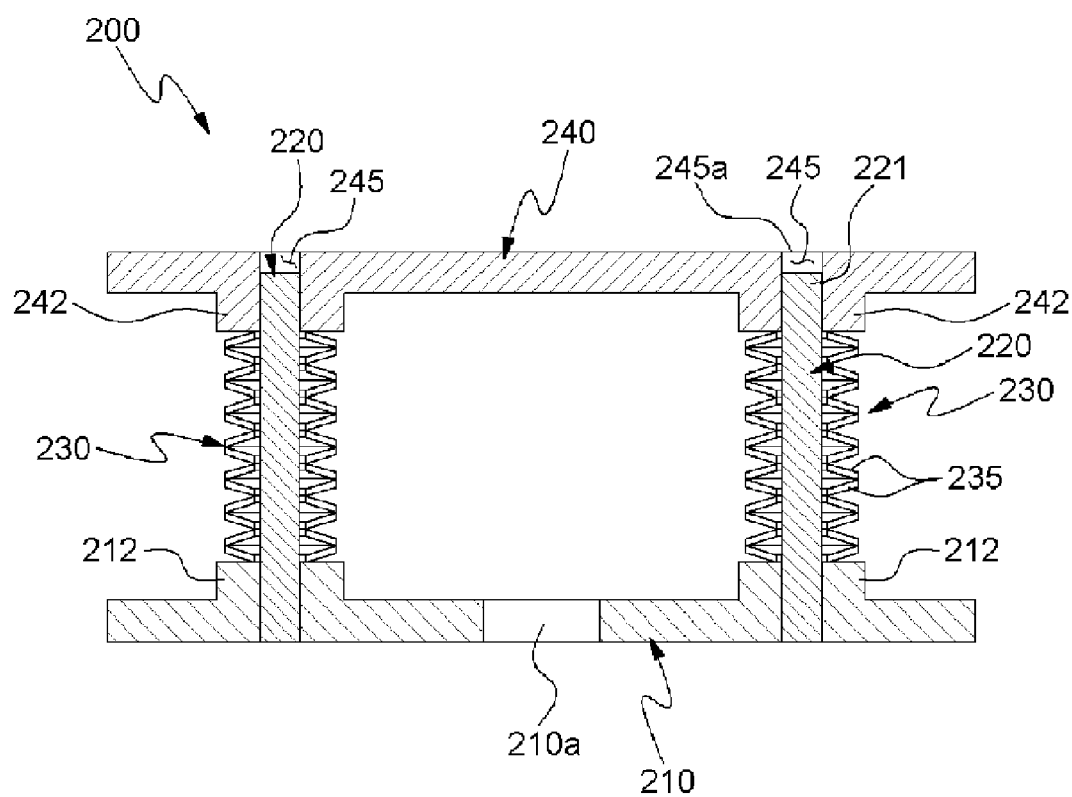
FIG. 26 is a cross-sectional configuration view illustrating a second embodiment of an impact absorption unit according to the present invention.

FIG. 26 illustrates another embodiment of the impact absorption unit 200.

Referring to FIG. 26, a first support part 212 may be formed at a contact surface between the first substrate 210 and the buffer member 230, and a second support part 242 may be formed at a contact surface between the second substrate 240 and the buffer member 230. That is, the first support part 210 may be formed on an upper surface of the first substrate 210, and the second support part 242 may be formed on a lower surface of the second substrate 240. In addition, the first and second support parts 212 and 242 may be integrally formed from the first substrate 210 and the second substrate 240, respectively. In addition, the first and second support parts 212 and 242 have a ring shape, and may have the same outer diameter as that of the flange members 235 constituting the buffer member 230. In this case, the second support part 242 formed on the second substrate 240 has a connection hole connected to the guide hole 245, and the upper end of the support rod 220 is inserted into the connection hole.

The buffer members 230 may stably closely contact the first substrate 210 and the second substrate 240 by the first and second support parts 212 and 242. In addition, in some cases, the first and second support parts 212 and 242 may also serve to adjust height. In addition, in the case of the second support part 242 formed on the second substrate 242, the length of the guide hole 245 may be extended, thereby stably guiding the upper end 221 of the support rod 220. More particularly, the above-described connection hole is formed in the second support part 242, and thus the length of the guide holes 245 formed in the second substrate 240 may be extended. Accordingly, the upper end 221 of the support rod 220 may be effectively prevented from escaping from the guide hole 245 of the second substrate 240.

Meanwhile, in the present invention, the thermal insulation material 300 is not particularly limited as long as it has thermal insulation properties, and may be any commonly used thermal insulation material. In addition, the thermal insulation material 300 may not only have thermal insulation properties, but may also have sound insulation properties. The thermal insulation material 300 may be selected from, for example, synthetic resin foams (polystyrene foam, polyurethane foam, polyethylene foam, polypropylene foam, and the like), ISOPINK (compressed synthetic resin foams, the term "ISOPINK" as used herein includes compressed Styrofoam, compressed polyethylene foam, compressed polypropylene foam, and the like), plaster boards, glass wool, mineral wool, rock wool, and fiber aggregates (cotton), but the present invention is not limited to the above examples.

In addition, in the present invention, the thermally conductive metal plate 500 is not particularly limited as long as it is a metal plate with thermal conductivity. The thermally conductive metal plate 500 may be made of, for example, a single metal selected from iron (Fe), copper (Cu), and aluminum (Al) or an alloy of these materials. The thermally conductive metal plate 500 may be made of an iron plate in consideration of raw material costs, or may be selected from an Al plate, an F-AL alloy plate, and the like in consideration of weight and thermal conductivity.

As described above, according to the present invention, the heating pipe 400 is installed between the thermal insulation material 300 and the thermally conductive metal plate 500. In this case, the heating pipe 400 may be installed in a form closely contacting a lower surface of the thermally conductive metal plate 500 as much as possible. Heat generated from the heating pipe 400 moves upward and is transmitted to the thermally conductive metal plate 500.

According to the present invention, compared to the related art, effective heating effects may be achieved. That is, conventionally, when heating pipes are embedded and installed in finishing mortar, the finishing mortar has low thermal conductivity and thus provides a low heating effect relative to energy consumption, while, according to the present invention, when the thermally conductive metal plate 500 is installed and the heating pipes 400 are installed on a lower side of the thermally conductive metal plate 500, thermal conductivity is effectively enhanced. More particularly, the metal plate 500 having a much higher thermal conductivity than that of a conventional finishing mortar effectively transmits and emits heat, and thus an excellent heating effect may be obtained with only low energy consumption. In addition, the thermal insulation material 300 is installed on a lower side of the heating pipe 400, and thus heat of the heating pipe 400 may be transmitted almost only upward by thermal insulation.

In addition, according to another embodiment, the floor construction structure according to the present invention may further include buffer pads 450. In particular, as illustrated in FIGS. 21 and 22, the buffer pad 450 may be installed at a contact interface between the impact absorption unit 200 and the thermally conductive metal plate 500. These buffer pads 450 serve a buffer function between the impact absorption unit 200 and the thermally conductive metal plate 500, and may be made of, for example, a rubber material, a synthetic resin material, a fiber material, or the like.

In addition, the floor construction structure according to the present invention may further include other elements, in addition to the above-described elements. For example, a finishing material may be installed on an upper portion of the thermally conductive metal plate 500. The finishing material may be selected from commonly used floor finishing materials. The finishing material may be selected from, for example, printed decorative sheets, floor pads, tiles, natural slate (marble, and the like), artificial marble (marble-shaped synthetic resin sheets, and the like), and/or red clay plates. In addition, the floor construction structure according to the present invention may further include various functional layers, in addition to the finishing material. For example, a red clay layer, a deodorization layer, a sterilization layer, a far infrared radiation emission layer, and/or a separate sound insulation layer may be further optionally formed.

According to the above-described embodiments of the present invention, a building floor may be simply constructed to have a rigid structure and early fire suppression may be achieved. In particular, the concrete main body 100A is structurally rigid. That is, the concrete main body 100A includes the base plate 10 made of a concrete material, and has a strong support force by the barrier 20 protruding from an upper portion of the base plate 10 and having a lattice structure and/or a honeycomb structure.

In addition, according to the present invention, excellent sound insulation properties and very light weight are obtained. For example, the fire-extinguishing water cells 30 are formed between the barriers 20, and thus light weight is secured, and noise and vibration are absorbed and dissipated (dispersed) by the fire-extinguishing water cells 30, thereby achieving excellent sound insulation properties, and the like.

In particular, excellent sound insulation properties, and the like are achieved by the impact absorption units 200 as described above. In addition, according to the present invention, a building floor is constructed by fastening the concrete structures 100 with each other via the tension wire TW, instead of being constructed by existing operations such as installation of casts, concrete casting, and the like, and thus construction work is convenient.

In addition, according to the present invention, early fire suppression is possible. In particular, the concrete structure 100 itself stores the fire-extinguishing water FW, and thus, when a fire occurs, the fire-extinguishing water FW may be rapidly injected, resulting in early fire suppression. In addition, the concrete structure 100 has excellent thermal conductivity due to its enhanced heating structure, and thus energy consumption (heating costs, and the like) may be reduced.

The invention claimed is:

1. A concrete structure for constructing a building floor, the concrete structure being a concrete structure for forming a building floor, and comprising:
   a concrete main body to store fire-extinguishing water for fire suppression; and
   a fire-extinguishing water injection unit to inject the fire-extinguishing water stored in the concrete main body,
   wherein the concrete main body comprises:
   a base plate;
   a barrier protruding upward from the base plate; and
   a plurality of fire-extinguishing water cells formed by the barrier and storing fire-extinguishing water, and
   wherein the fire-extinguishing water injection unit comprises:
   a fire-extinguishing water container embedded in each fire-extinguishing water cell of the concrete main body and storing the fire-extinguishing water;
   a fire-extinguishing water discharge pipe to discharge the fire-extinguishing water stored in the fire-extinguishing water container embedded in each fire-extinguishing water cell of the concrete main body; and
   a fire-extinguishing water injector installed at an end of the fire-extinguishing water discharge pipe and injecting the fire-extinguishing water.

2. The concrete structure according to claim 1, wherein the concrete main body further comprises:
   a fire-extinguishing water inlet to inject the fire-extinguishing water into the fire-extinguishing water cell; and
   a fire-extinguishing water flow path to connect the fire-extinguishing water cells to each other to allow a fluid to flow therebetween.

3. The concrete structure according to claim 1, wherein:
   the concrete main body further comprises:
   a fire-extinguishing water inlet to inject the fire-extinguishing water into the fire-extinguishing water cell; and
   a fire-extinguishing water flow path to connect the fire-extinguishing water cells to each other to allow a fluid to flow therebetween, and the fire-extinguishing water container comprises:
   a container main body to store the fire-extinguishing water;
   a fire-extinguishing water introduction part installed in the container main body and through which the fire-extinguishing water is introduced;
   a fire-extinguishing water discharge part installed in the container main body and connected to the fire-extinguishing water discharge pipe; and
   a fire-extinguishing water supply part installed in the container main body and connected to the fire-extinguishing water flow path.

4. The concrete structure according to claim 1, further comprising a protective member installed on an upper portion of the fire-extinguishing water cell.

5. The concrete structure according to claim 1, further comprising a protective member installed on an upper portion of the fire-extinguishing water cell.

6. The concrete structure according to claim 2, further comprising a protective member installed on an upper portion of the fire-extinguishing water cell.

7. The concrete structure according to claim 3, further comprising a protective member installed on an upper portion of the fire-extinguishing water cell.

* * * * *